US010715746B2

(12) United States Patent
Jhawar et al.

(10) Patent No.: US 10,715,746 B2
(45) Date of Patent: Jul. 14, 2020

(54) ENHANCED TELESTRATOR FOR WEARABLE DEVICES

(71) Applicant: RealWear, Incorporated, Milpitas, CA (US)

(72) Inventors: Sanjay Subir Jhawar, Menlo Park, CA (US); Christopher Iain Parkinson, Richland, WA (US); Stephen A. Pombo, Campbell, CA (US)

(73) Assignee: Realwear, Inc., Vancouver, WA (US)

( * ) Notice: Subject to any disclaimer, the term of this patent is extended or adjusted under 35 U.S.C. 154(b) by 150 days.

(21) Appl. No.: 15/697,279

(22) Filed: Sep. 6, 2017

(65) Prior Publication Data

US 2019/0075254 A1 Mar. 7, 2019

(51) Int. Cl.
| | |
|---|---|
| *G06F 3/01* | (2006.01) |
| *H04N 5/272* | (2006.01) |
| *H04N 5/262* | (2006.01) |
| *G02B 27/01* | (2006.01) |
| *G02B 27/00* | (2006.01) |

(52) U.S. Cl.
CPC ......... *H04N 5/272* (2013.01); *G02B 27/0172* (2013.01); *H04N 5/2621* (2013.01); *G02B 27/0093* (2013.01); *G02B 2027/0138* (2013.01); *H04N 2201/0027* (2013.01); *H04N 2201/0039* (2013.01)

(58) Field of Classification Search
CPC ................. H04N 5/272; H04N 5/2621; H04N 2201/0039; H04N 2201/0027; G02B 27/0172; G02B 2027/0138; G02B 27/0093
See application file for complete search history.

(56) References Cited

U.S. PATENT DOCUMENTS

| | | | |
|---|---|---|---|
| 2005/0057439 A1* | 3/2005 | Hata ...................... | A42B 1/245 345/8 |
| 2008/0186255 A1* | 8/2008 | Cohen .................. | G02B 27/017 345/8 |
| 2009/0097697 A1* | 4/2009 | Miyake ................ | G06K 9/2027 382/100 |
| 2009/0185031 A1* | 7/2009 | Miyake .............. | G06K 9/00476 348/61 |

(Continued)

*Primary Examiner* — Jose R Soto Lopez
(74) *Attorney, Agent, or Firm* — Shook, Hardy & Bacon, LLP

(57) ABSTRACT

Enhanced telestrators are presented. Such enhanced telestrators provide visual elements (e.g. annotations and/or visual cues) to a user of a wearable device, such as a head-mounted display device. The visual elements may be superimposed, combined, composited, blended, and/or layered over image data displayed by a display device included in the wearable device. The visual elements may also be projected (by a projection system included in the wearable device), onto physical surfaces of the user's environment. Such projection systems may include lasers and/or light emitting diodes for photon source. The projection systems are enabled to project the visual elements onto surfaces of the environment of the user of the wearable device. More particularly, the various embodiments herein provide annotations and/or visual cues superimposed over image data viewed by the user and/or projected onto (and reflected by) physical surfaces the user's environment, via a photon-emitter.

18 Claims, 18 Drawing Sheets

(56) References Cited

U.S. PATENT DOCUMENTS

| | | | |
|---|---|---|---|
| 2011/0245670 A1* | 10/2011 | Tashiro | G01S 7/52084 600/443 |
| 2012/0320158 A1* | 12/2012 | Junuzovic | G06F 3/017 348/46 |
| 2013/0024785 A1* | 1/2013 | Van Wie | G06F 3/04815 715/753 |
| 2016/0055676 A1* | 2/2016 | Kasahara | G06F 3/048 345/633 |
| 2016/0260261 A1* | 9/2016 | Hsu | B23K 9/1087 |
| 2016/0350595 A1* | 12/2016 | Solomin | G06K 9/00671 |
| 2016/0358383 A1* | 12/2016 | Gauglitz | G06F 3/011 |
| 2016/0371884 A1* | 12/2016 | Benko | G06T 19/006 |
| 2017/0045746 A1* | 2/2017 | Ellsworth | G02B 5/30 |
| 2017/0243406 A1* | 8/2017 | Yamazaki | G09G 3/002 |
| 2017/0295360 A1* | 10/2017 | Fu | G02B 27/017 |
| 2018/0061003 A1* | 3/2018 | Kono | G06F 3/012 |
| 2018/0074332 A1* | 3/2018 | Li | G02B 27/0172 |
| 2018/0143433 A1* | 5/2018 | Fujimaki | G02B 27/0172 |
| 2018/0281950 A1* | 10/2018 | Aruga | G02B 27/017 |
| 2018/0307378 A1* | 10/2018 | Ishikawa | G02B 27/02 |
| 2018/0373291 A1* | 12/2018 | Fukuda | H04N 9/3173 |
| 2019/0018243 A1* | 1/2019 | Parkinson | G02B 27/017 |
| 2019/0037171 A1* | 1/2019 | Nagpal | H04L 12/1822 |
| 2019/0094554 A1* | 3/2019 | Benesh | G02B 27/017 |
| 2019/0295285 A1* | 9/2019 | Shinohara | G02B 27/0172 |

* cited by examiner

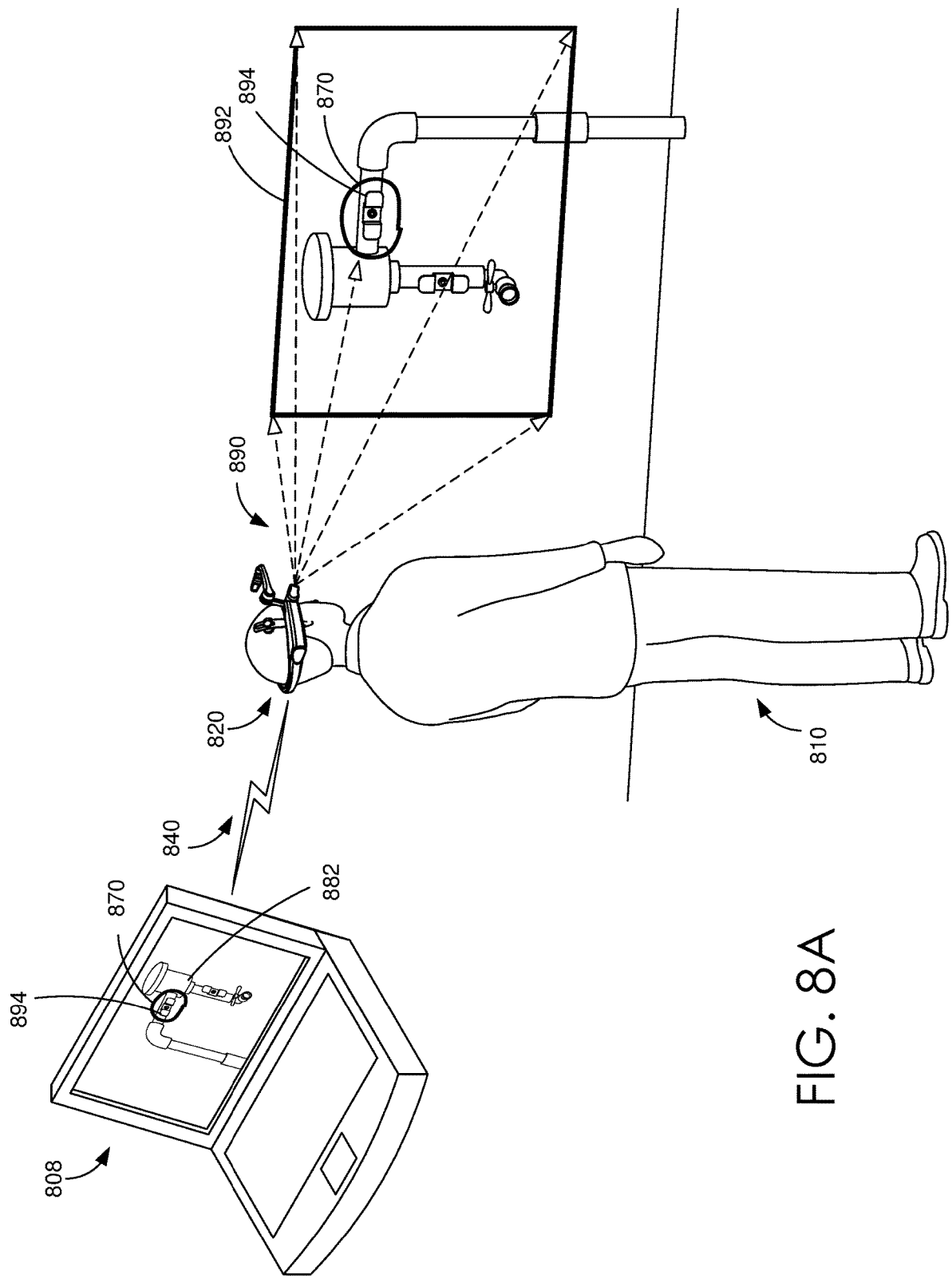

ENHANCED TELESTRATOR FOR WEARABLE DEVICES

BACKGROUND

A conventional telestrator enables an annotator to draw freehand (or otherwise superimpose) visual elements (e.g. annotations and/or visual cues) over images, such as over an image or a video feed. Such visual elements are often superimposed over an image to draw a viewer's attention to regions or objects depicted within the image. For instance, a sportscaster may employ a telestrator to draw annotations over a video-replay of portions a sporting event. Such annotations assist in elucidating, or otherwise clarifying, aspects of the sportscaster's commentary of the sporting event. In addition to sporting-event applications, telestrators are frequently employed to superimpose visual cues (i.e. telestrations) over images associated with weather reporting, educational, military, medical, legal, industrial, as well as many other applications.

However, such conventional telestrators require an image to annotate and a display device to view the annotated image. More specifically, for conventional telestrators, the annotator typically annotates an image. The annotated image is then transmitted to a display device for display to the viewer. Thus, to provide visual cues, conventional telestrator methods require a display device to receive and display the annotated images. Even if a display device is available, it may be unsafe or otherwise undesirable to have the viewer diverting their glance (or attention) to the display device. Additionally, it may be beneficial to provide other annotations and/or visual cues in scenarios outside of superimposing the annotations and/or visual cues over image data. It is for these and other concerns that the following disclosure is provided.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

At a high level, embodiments described herein, include a method for operating a computing device, such as but not limited to a wearable device. The computing device includes a photon-detector (e.g. a camera) and a photon-emitter (e.g. a photon source, a photon transmitter, a photon projector, or the like). In some embodiments, the computing device includes a data transceiver (i.e. a data receiver and a data transmitter). The computing device device may include a display device.

The method includes receiving an instruction (e.g. a request) to provide a visual element at a first location within a field-of-view (FOV) of the photon-detector. In some embodiments, the instruction is received from another computing device, such as a remote computing device. In other embodiments, the instruction may be generated by one component in the computing device and received by another component of the computing device, In response to receiving the instruction, the photon-emitter may be employed to transmit photon beams. The photon beams are transmitted such that visual element is projected onto a surface of (or located at) the first location within the first FOV of the photon-detector. The visual element may be a telestration element. In at least some embodiments, the computing device is a wearable computing device, such as but not limited a head-mounted display (HMD) device. In other embodiments, the computing device may be a networked camera device, a mobile device, or the like. The photon-emitter may include a coherent photon-source, such as but not limited to a laser. In another embodiment, the photon-emitter may include a light emitting diode (LED). The LED may be collimated. The photon-emitter may include a collimated and/or scanning photon source.

The method may further include employing the photon-detector to generate image data of the first FOV of the photon-detector and providing the image data to a remote computing device. The image data may encode the surface located at the first location within the first FOV of the photon-detector. A user of the remote computing device may employ the remote computing device to view the image data and generate the instruction to provide the visual element at the first location within the first FOV of the photon-detector. The instruction may be received from the remote computing device.

In some embodiments, the instruction includes an indication of an object within the first FOV of the photon-detector. The photon-emitter may be employed to transmit the photon beams such that the projected visual element visually indicates the object within the first FOV of the photon-detector. The photon-detector may be employed to generate image data of a second FOV of the photon-detector, where the object is within the second FOV of the photon-detector. There may have been relative movement (i.e. motion) between the object and the user employing and/or wearing the computing device between the temporal displacement of the first and second FOVs of the photon-detector. For example, either the user or the object may have moved during the transition from the first FOV to the second FOV.

The method may employ a computer-vision engine, to select a portion of the image data that encodes the object. That is computer- and/or machine vision is employed to select the portion of the image data of the second FOV that encodes the object. A second location within the second FOV of the photon-detector is determined based on the selected portion of the image data. The photon-emitter is employed to transmit additional photon beams such that an updated (or another) visual element is projected onto the surface (or another surface). The surface (or the other surface) is located at the determined second location within the second FOV of the photon-detector. The updated visual element visually indicates the object within the second FOV of the photon-detector. Thus computer- and/or machine-vision may be employed to track the object in real-time.

In at least one embodiment, the photon-emitter is employed to transmit another photon beam. The other photon beam may be transmitted such that another visual element is projected onto another surface that is located at a boundary of the first FOV of the photon-detector. For instance, the other visual element may be a bounding box that marks the boundary of the first FOV of the photon-detector. In at least one embodiment, the other photon beam may be transmitted such that another visual element is projected onto another surface that is located at a center of the first FOV of the photon-detector. For example, the other visual element may be a solid circular (or oval), a "bulls-eye", a "cursor", "center-of-a-target", or the like, that marks the center of the first FOV of the photon-detector.

In at least one embodiment, the computing device includes a display (e.g. a display device). The photon-detector is employed to generate image data of the first FOV of the photon-detector. A location of the display, relative to a line-of-sight (LOS) of the user employing and/or wearing the computing device, may be automatically determined. When the location of the display is located within the LOS of the user, the computing device may be operated in a first operational mode (e.g. a display mode). When the location of the display is outside of (or excluded from) the LOS of the user, the computing device may be operated in a second operational mode (e.g. a projection mode). In at least one embodiment, when operating in the first operational mode, the display may be employed to display a combination, blend, composite, or a layering of the image data and the visual element. The visual element is located at a location on the display that corresponds to the first location within the first FOV of the photon-detector. The location of the display, relative to the LOS of the user, may be automatically determined based on a signal generated by a position-detecting sensor and/or switch, such as but not limited to Hall Effect switch (or a sensor) included in the computing device. Other position-detecting sensors and/or switches include optical sensors, electrical sensors, magnetic sensors, mechanical sensors, and the like.

Additional objects, advantages, and novel features of the invention will be set forth in part in the description which follows, and in part will become apparent to those skilled in the art upon examination of the following, or may be learned by practice of the invention.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-6 illustrate an embodiment of the present invention and in which:

FIG. 1 provides a schematic diagram showing an exemplary operating environment for operating a wearable device in accordance with some implementations of the present disclosure;

FIG. 2 shows an exemplary embodiment of a head-mounted display device, in accordance with some implementations of the present disclosure;

FIG. 6 shows a wearable device projecting telestrations onto physical surfaces of the user's environment, in accordance with some of the implementations of the present disclosure;

FIGS. 8A-8B show a wearable device projecting telestrations to indicate an object in the user' environment while the user in is motion relative to the object, in accordance with some of the implementations of the present disclosure;

DETAILED DESCRIPTION

Figure 1:
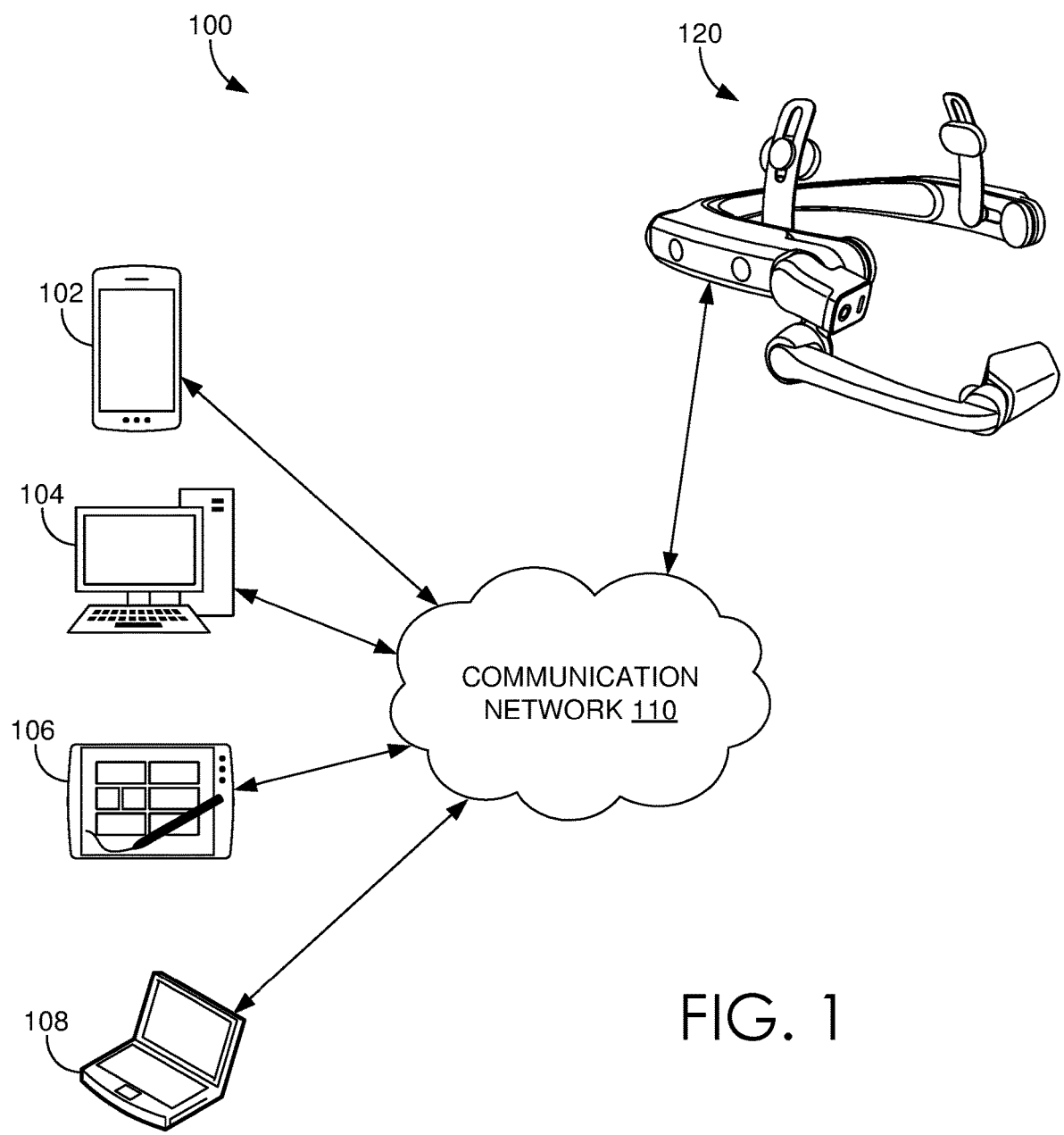

The various embodiments are directed towards methods, systems, and computing devices that provide visual elements (e.g. annotations and/or visual cues) to a user of the wearable device. Such visual elements may herein be collectively referred to as "telestrations." That is, embodiments include methods of operating various computing devices to provide telestrations to a remote user. Such computing devices include, but are not otherwise limited to wearable devices. Such wearable devices include, but are not otherwise limited to head-mounted display (HMD) devices. Although many of the various embodiments discussed herein are directed to wearable devices, it should be understood that the various methods and systems for providing visual elements are not limited to wearable devices, such as HMD devices. Rather, the various methods may be employed in other computing devices, such as but not limited to networked camera devices that include one or more photon-emitters, or virtually any computing device that includes at least one photon-emitter. In some embodiments, the visual elements may be superimposed, combined, composited, blended, and/or layered over image data displayed by a display device included in the wearable device.

In addition (or in the alternative) to superimposing visual elements over image data displayed by a display device, the visual elements may be projected (by a projection system included in the wearable device), onto physical surfaces of the user's environment. For instance, the various embodiments of wearable devices discussed herein include photon-emitter based projection systems. The various embodiments of wearable devices herein include a scanning photon-emitter (such as but not limited to one or more laser sources and/or one or more light emitting diodes (LEDs) enabled to project telestrations onto surfaces of the environment of the user of the wearable device. Thus, some embodiments include a laser-based and/or a LED-based telestrator (i.e. an enhanced telestration system) embedded and/or integrated with a wearable device. As used herein, an enhanced telestrator may be enabled to selectively project telestrations onto physical surfaces. More particularly, the various embodiments herein provide annotations and/or visual cues superimposed over image data viewed by the user and/or projected onto (and reflected by) physical surfaces the user's environment, via a photon-emitter.

Conventional telestrators enable superimposing visual elements over images. Such telestrations are often superimposed to draw a viewer's attention to regions or objects depicted within the image. For instance, a weather reporter may employ a conventional telestrator to draw annotations and/or visual cues over a satellite weather image. In one example, the weather reporter may draw a boundary around a cloud formation that is indicative of a forecasted weather pattern. Such superimposed telestrations may serve to elucidate, explain, or otherwise clarify, aspects of commentary associated with reporting of the weather forecast.

However, such conventional telestrators provide visual cues only within an image displayed on a display device. In some situations, it may be beneficial to provide visual annotations and/or visual cues projected onto physical surfaces of the user's environment. For example, when providing instruction to a remote user, it may be beneficial to project visual elements onto physical surfaces of the user's environment, rather than superimposing the visual elements over image data displayed by a visual device. That is, in order to provide elucidations, clarifications, and/or explanations of lectures, lessons, instructions, or the like to a user, it may be beneficial to provide visual-based annotations or cues, in reference to physical objects within a remote user's environment. Conventional telestrators do not provide projections of visual elements onto the user's environment. However, in contrast to conventional telestrators, the various enhanced telestrators and telestrations methods discussed herein are enabled to project visual elements onto physical surfaces of the user's environment, via photon-emitters included in wearable devices.

Furthermore, in some circumstances, it may be unsafe or otherwise undesirable to have the user diverting their glance (or attention) away from their environment and towards a display device to view annotations or other visual cues superimposed on images. Some display devices may restrict the user's view of, or otherwise divert the user's attention away from their environment or immediate surroundings. For example, within industrial and other settings, there may exist particular scenarios where providing visual cues to a user is desirable. However, limiting the user's view or attention to an obtrusive display device poses significant safety risks to the user, as well as others.

As noted above, conventional telestrators may require the user to divert their attention away from their environment and towards a display device. In contrast to such conventional telestrators, the embodiments herein include wearable devices (such as but not limited to HMD devices) that provide an unobtrusive display device within the line-of-sight (LOS) of the user. Via the unobtrusive display device, the user may unobtrusively view visual elements (i.e. telestrations) within the display device, while still focusing at least a portion of their attention on the environment. It at least some embodiments, the display device of the wearable device is an augmented-reality (AR) and/or a mixed-reality (MR) display device. That is, the display device is enabled to display computer-generated visual elements and is at least partially optically transparent. The user may view their environment through the transparent display device, as well as any telestrations displayed on the AR and/or MR display device.

In some embodiments, such, but not limited to, those directed towards HMD devices, the display device is repositionable with respect to the user's line-of-sight (LOS). The user may readily displace or position the display device to be either within or outside of their LOS. When the display is excluded from the user's LOS, any visual element that may have been displayed via the display device, may alternatively be projected onto surfaces of the user's physical environment. Thus, a wearable device may be operated in a display mode (e.g. display visual elements on a display device) or a projection mode (e.g. project visual elements on environmental surfaces) based on a location of the display device, relative to the user's LOS. In some embodiments, transitioning the wearable device between a display mode and a projection mode may be automatically performed based on a determination or detection of the location of the display device relative to the user's LOS.

The various embodiments provide enhanced telestration services for users of wearable devices. The enhanced telestration services provide users with annotations and/or visual cues (i.e. telestrations) superimposed on image data and/or projected onto physical surfaces of the user's environment. Enhanced telestration services may employ one or more photon-detectors (e.g. camera devices or other photon sensing devices) included in the wearable device.

Some embodiments may include real-time enhanced telestration services. In such real-time embodiments, the photon-detector generates (or captures) image data of the field-of-view (FOV) of the photon-detector. The image data may be provided, via a data transceiver included in the wearable device, to an annotator (i.e. a user employing a computing device that is remote relative to the wearable device). The annotator may employ the remote computing device to view the image data and provide telestrations via methods enabled by their computing device.

For instance, the annotator may employ the remote computing device to view the transmitted image data, as well as draw, sketch, or otherwise indicate visual elements over the image data. The remote computing device may provide an instruction or request to the wearable device, via the data transceiver of the wearable device. The instruction may be an instruction and/or a request to provide the visual elements to the user at specified positions within the image data or within the FOV of the wearable device's photon-detector. As such, the visual elements are provided to the user of the wearable device, via the display device and/or projected onto the physical surfaces of their environment. In other embodiments, the instruction is generated by a first component of the wearable device and received by another component of the wearable device.

In various embodiments, the photon-detector is configured and arranged such that the FOV of the photon-detector is at least similar to the FOV of the user of the wearable device. Thus, the annotator may view and telestrate the FOV of the user (and/or the photon-detector) of the wearable device in real time. The user may view such telestrations in in real-time, either via the display device of the wearable devices and/or projections on surfaces of their environment. In other embodiments, the annotator may telestrate images that are displayed on the display device of the wearable device. Thus, the various embodiments provide real-time enhanced telestration services to a user wearing the wearable device.

FIG. 1 provides a schematic diagram showing an exemplary operating environment 100 for operating a wearable device in accordance with some implementations of the present disclosure. Environment 100 includes one or more wearable devices, such as but not limited to head-mounted display (HMD) device 120 and one or more user computing devices. Such user computing devices include, but are not otherwise limited to smartphone 102, desktop 104, tablet 106, and laptop 108. Various embodiments of HMD device 120 are discussed in conjunction with at least FIGS. 2A, 2B, 3A, 3B, and 12. However, briefly here, HMD device 120 is a wearable computing device that provides computing and communication capabilities to the wearer. In the non-limiting body shown in FIG. 1, a wearable device (e.g. HMD device 120) may be worn about the head of the user. Other embodiments are not so limited. Various embodiments of user computing devices, such as computing devices 102-108 are discussed in conjunction with FIG. 13.

Environment 100 additionally includes a communication network, such as but not limited to communication network 110, which communicatively couples each of user computing devices 102-108 and HMD device 120. Communication network 110 may be any communication network, including virtually any wired and/or wireless communication technologies, wired and/or wireless communication protocols, and the like. It should be understood that communication network 110 may be virtually any network that communicatively couples at least one of user computing devices 102-108 with a wearable device, such as but not limited to HMD device 120.

Figure 2:
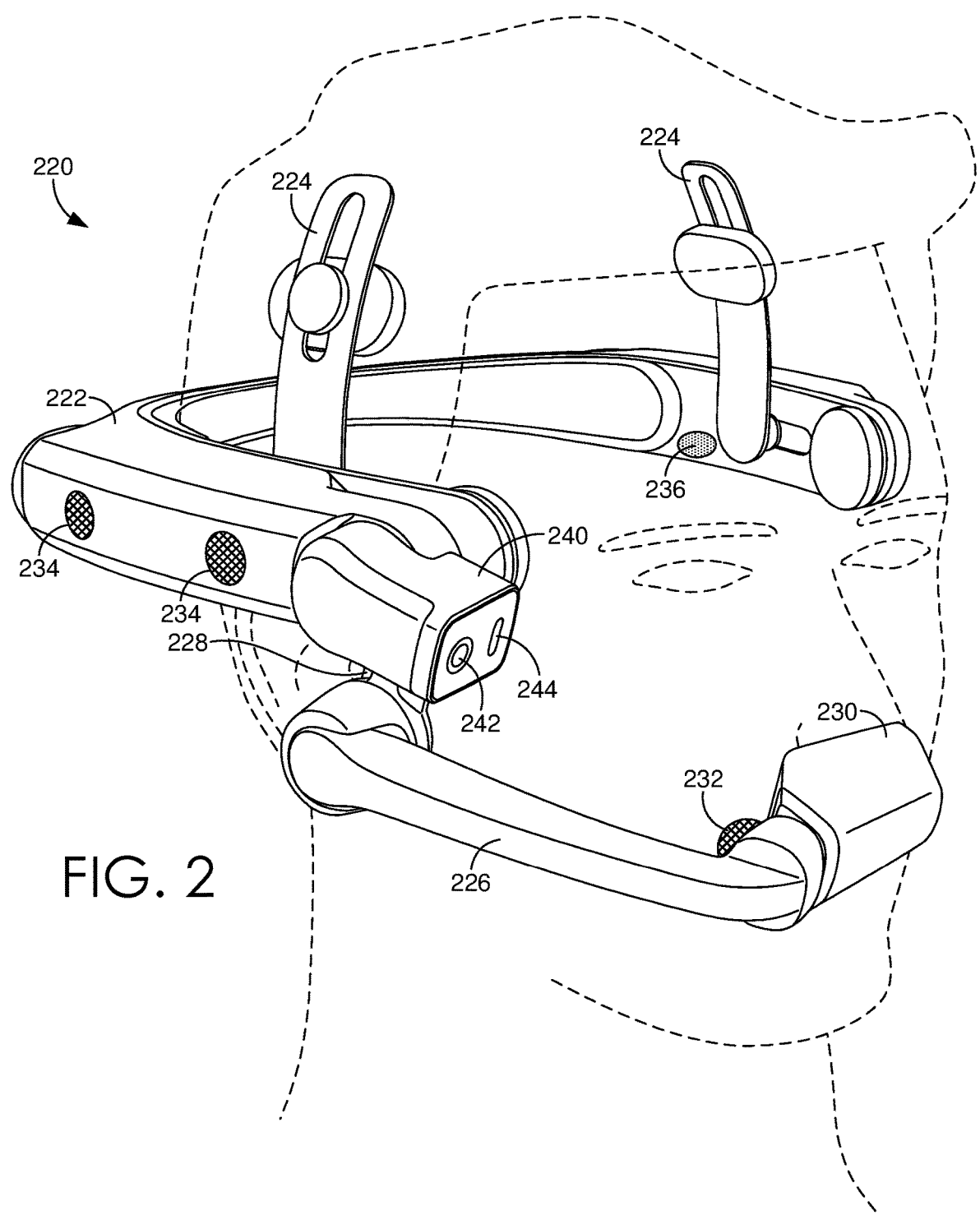

FIG. 2 shows an exemplary embodiment of a HMD device 220, in accordance with some implementations of the present disclosure. HMD device 220 is a wearable device and may include similar features to that of wearable device 1200 of FIG. 12. HMD device 220 may be similar to HMD device 120 of FIG. 1. HMD device 220 includes a frame member 222. Frame member 222 may be a frame structure. As shown in FIG. 2, frame member 222 is configured and arranged for wearing by a user. For instance, frame member 222 may be worn about the user's head. HMD device 220 may additionally include one or more stabilizing members 224 (or stabilizing structures) that stabilize the frame member 222 about the user's head.

HMD device 220 may include one or more rotating members, such as but not limited to first rotating member 226 and second rotating member 228. As discussed in conjunction with FIGS. 3A-3B, at least one rotating members 226 or 228 is rotatably coupled to frame member 222, i.e. at least one of rotating members 226 or 228 is coupled to frame member and configured and arranged for rotating relative to frame member 222. In at least one embodiment, first rotating member 226 may be a boom arm that is coupled to a display module 230. Display module 230 houses a display device (not shown in FIG. 2) that is directed towards the eyes of the users. As shown in FIG. 2, the display device is within the user's line-of-sight (LOS). As discussed in conjunction with FIGS. 3A-3B, the user may re-position the display device, via a rotation of one or more of rotating members 226/228, such the display device is excluded from the user's LOS. Note that in the view of HMD device 220 shown in FIG. 2, the display device is occluded by external surfaces display module 230.

HMD device 220 includes various electroacoustic transducers (e.g. microphones and audio speakers). One such electro acoustic transducer 232 is located near a distal end of rotating member 226. Electroacoustic transducer 232 may be a primary microphone. In various embodiments, HMD device 220 includes one or other electroacoustic transducers, including but not limited to one or more auxiliary microphones 234 and one or more audio speakers, such as but not limited to audio speaker 236.

HMD device 220 may include an optical module 240 that houses one or more photon-detectors (e.g. camera devices), such as photon-detector 242 and a projection system 244. Projection system 244 may include one or more photon-emitters (e.g. scanning lasers, scanning light emitting diodes (LED), and the like). Optical module 240 may be configured and arranged to rotate relative to frame member 222, such that the field-of-view (FOV) of the photon-detector 242 may be rotationally varied. In at least some rotational orientations of optical module 240, the FOV of photon-detector 242 is at least similar to the FOV of the user.

Figure 3A:
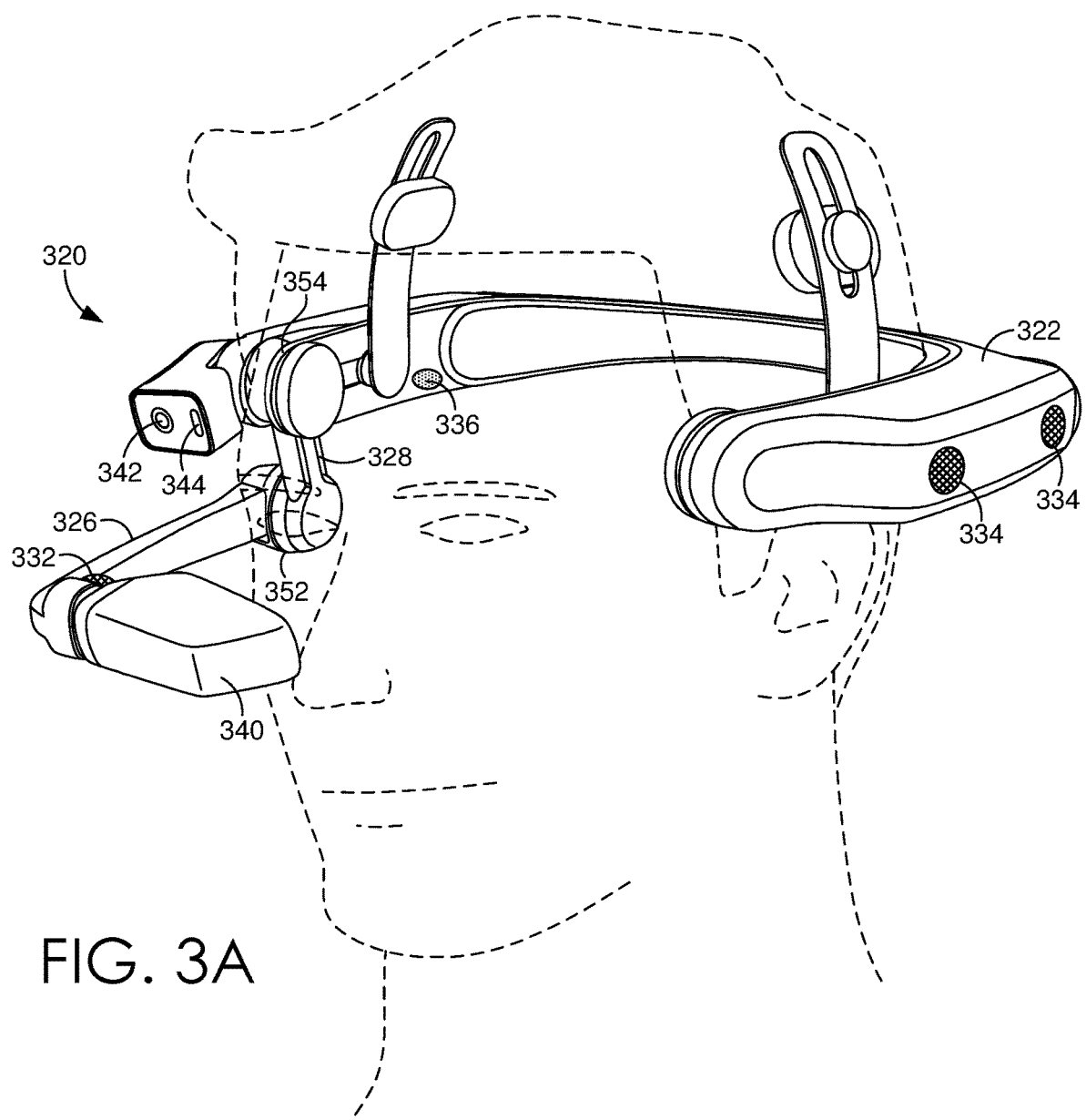
FIG. 3A shows an exemplary embodiment of a head-mounted display device, where the position of the display device is within the line-of-sight of the user.
Figure 3B:
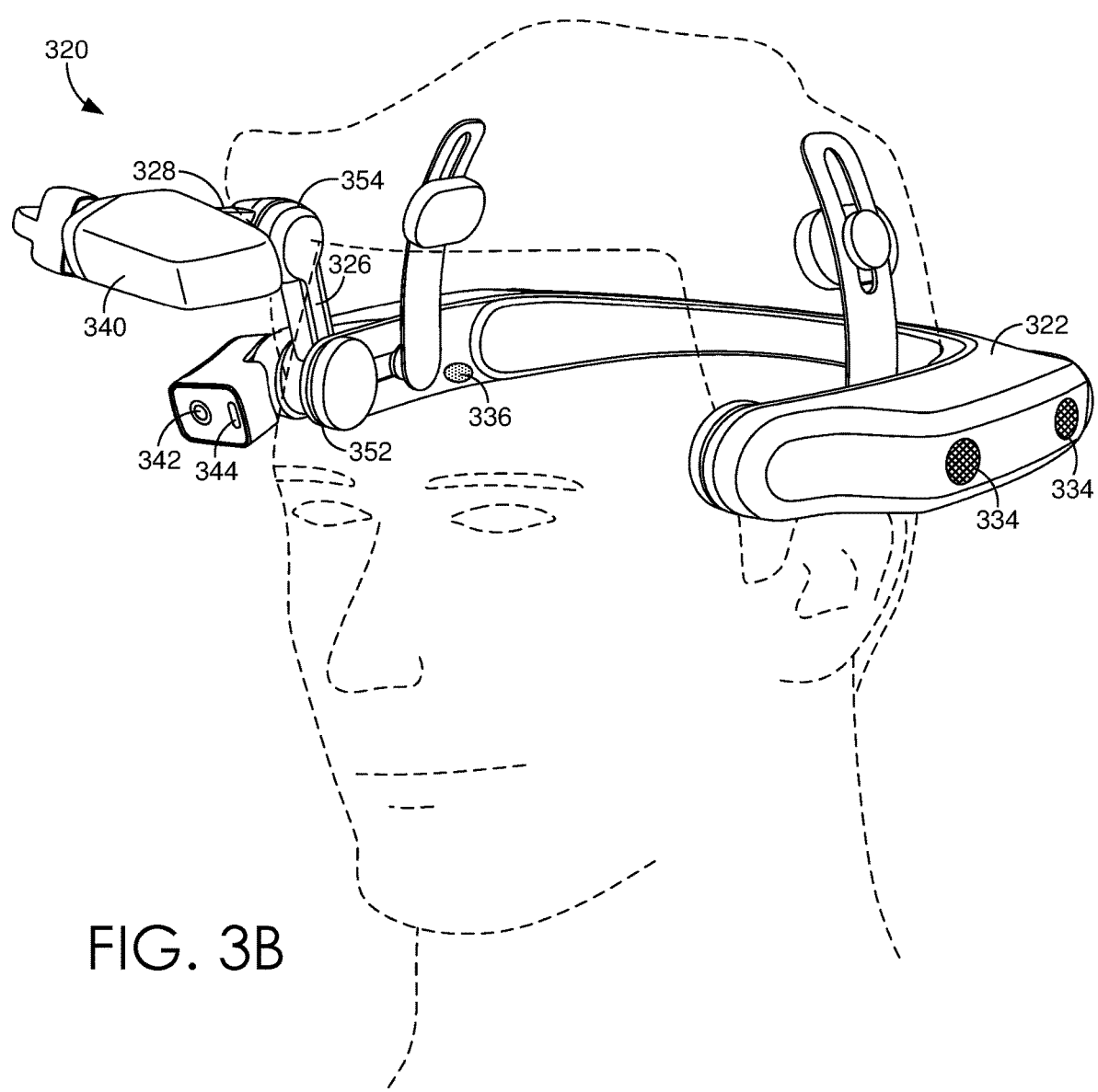
FIG. 3B shows the head-mounted display device of FIG. 3A, where the position of the display device is outside the line-of-sight of the user.

FIG. 3A shows an exemplary embodiment of HMD device 320, where the position of the display device is within the LOS of the user. FIG. 3B shows the HMD device 320 of FIG. 3A, where the position of the display device is outside the LOS of the user. In the various embodiments, when the display device is positioned such as that shown in FIG. 3A, HMD device 320 may be operated in a first operational mode (e.g. a display mode). When the display device is positioned outside of the user's line-of-sight (LOS) (such as that shown in FIG. 3B), HMD device 320 is operated in a second operational mode (e.g. a projection mode.)

HMD device 320 includes frame member 322, first rotating member 226, and second rotating member 328. HMD device 320 includes primary microphone 332 and multiple auxiliary microphones 334, as well as one or more audio speakers 336. Furthermore, HMD device 320 includes one or more cameras 342 and projection system 344. As discussed below, projection system 344 may include one or more photon-emitters, such as but not limited to scanning laser sources and/or scanning LEDs. Camera 342 may be a photon-detector. Display module 340 houses the display device that is directed towards the eyes of the user. Note that in the view of HMD device 320 shown in FIGS. 3A-3B, the display device is occluded by external surfaces display module 340.

As noted above, FIG. 3A shows that display module 340 may be positioned such that the display device is within the line-of-sight (LOS) of the user. A comparison of FIG. 3B with FIG. 3A shows that at least one of first rotating member 326 and/or second rotating member 328 can be rotated, relative to frame member 322, such that the display device is outside of (or excluded from) the LOS of the user. More particularly, second rotating member 328 is rotatably coupled to frame member 322 via a first rotational joint 354 and first rotating member 326 is rotatably coupled to second rotating member 328 via a second rotational joint 352.

Thus, by varying at least one or a first rotational orientation between the frame member 322 and the second rotating member 328 and/or a second rotational orientation between the second rotating member 328 and the first rotating member 226, a user may rotate the position of the display axis about an axis relative to their head.

More particularly, by rotating the position of the display (about the axis relative to their head), the user may selectively position the display module 340 such that the display device is within their LOS. Similarly, the user may selectively position the display module 340 such that the display device is outside of (or excluded from) from their LOS by varying the first rotational orientation between the frame member 322 and the second rotating member 328 and/or the second rotational orientation between the second rotating member 328 and the first rotating member 226. Note that by varying the first rotational orientation, a first angle between the frame member 322 and the second rotating member 328 is varied. Similarly, varying the second rotational orientation generates a variance in a second angle between the second rotating member 328 and the first rotating member 326. Further note that by varying at least one of the first or the second angle generates a variance in an angle between the display device and the frame member 322.

Whether the display device is within or outside the LOS of the user may be determined based on at least one of a first angle (i.e. the angle between frame member 322 and second rotating member 328), the second angle (i.e. the angle between second rotating member 328 and first rotating member 326), and/or the lengths of first/second rotating members 326/328. In various embodiments, one or more sensors are included in first rotational joint 354 to automatically detect and/or determine the first angle. Similarly, one or more position-detecting sensors and/or switches may be included in second rotational joint to automatically determine the second angle. Such sensors may include, but are not otherwise limited to Hall Effect sensors and/or Hall Effect switches. Other position-detecting sensors and/or switches include optical sensors, electrical sensors, magnetic sensors, mechanical sensors, and the like. According whether the display device is within or excluded from the user's LOS may be automatically determined based on one or more signals generated by sensors that are employed to detect a relative rotation and/or an angle between multiple members of a wearable device, such as but not limited to HMD device 320.

HMD device 320, as shown in FIGS. 3A-3B, is a non-limiting embodiment, and transitioning and/or repositioning a display device within and out of the user's LOS may be accomplished via configurations other than relative rotations and/or rotational orientations of frame member 322, first rotating member 326, and second rotating member 328. Note that first and second rotating members 326/328 may comprise a rotatable boom arm for supporting the display module 340. Thus, the boom arm may be articulated within and out of the user's LOS.

Furthermore, other methods for determining when the display device is within or outside of the user's LOS may be employed for other configurations other than relative rotations between members of HMD device 320. For instance, relative translations between members supporting the display device may be sensed and/or detected.

When the display device is transitioned from within the user's LOS to outside the user's LOS, an operational mode of HMD device 320 is transitioned from a display mode to a projection mode. Similarly, when the display device is transitioned from outside the user's LOS to within the user's LOS, the operational mode of HMD device 320 may be transitioned from the projection mode to the display mode.

Briefly, when HMD device 320 is operated in display mode, telestrations may be provided to the user via the display device. When HMD device 320 is operated in projection mode, telestrations may be projected onto surfaces of the user's environment via projection system 344. In at least some embodiments, telestrations may simultaneously be provided to the user via each of the display device and the projection system 344. In at least one embodiment, telestrations may be projected onto the surfaces of the user's environment when the display device is within the LOS of the user. Similarly, telestrations may be displayed on the display device even when the display device is outside of the user's LOS.

That is, projection system 344 may enable and/on provide such projected telestrations. Projection system 344 may include one or more photon-emitters, such as but not limited to scanning laser sources and/or scanning LEDs, as well as additional optical and/or mechanical components to control the projection of the telestrations. For instance, project system 344 may include one or more scanning and/or rotating mirrors to control direction and/or angular orientation, as a function of time, of the transmission of the photon beams generated by the photon-emitters. By controlling the direction of the transmission of the photon beams, virtually any pattern and/or visual element may be projected onto specific surfaces of the user's environment.

Projection system 344 may include a first mirror that rotates about a first axis to control the azimuthal-orientation for the transmission of one or more photon beams, and a second mirror that rotates about a second axis to control the polar-orientation for the transmission of the one or more photon beams. The rotation of the mirrors may be dynamically controlled via one or more actuators, servomechanisms (e.g., servos), microelectromechanical devices (MEMS), and the like. More complicated systems of mirrors may be employed to dynamically control the projection of the telestrations. Projection system 344 may include additional optical, electrical, and/or mechanical elements to dynamically control the projection of telestrations. For example, projection system 344 may include various lenses, beam collimators, beam splitters, beam polarizers, beam strobes, beam shutters, and the like.

At least a portion of the optical components included in projection system 344 may be dynamically controlled by one or more processor and/or logic devices included in projection system 344. For instance, the position and/or rotational orientation of various optical elements may be dynamically controlled and/or adjusted via a microprocessor and one or more MEMs included in projection system 344. The position of various mirrors, lenses, and the like may be dynamically adjusted. For instance, in addition to rotating various mirrors, at least one mirror included in projection system 344 may be translated. Some mirrors and/or lenses may be translated in a first direction, while other mirrors and/or lenses may be translated in a second direction that is orthogonal to the first direction. Some optical components may be translated in two or more orthogonal directions. Similarly, some optical components may be rotated about a first rotational axis, and other optical components may be rotated about a second rotational axis that is orthogonal to the first rotational axis. At least some of the optical components may be enabled to rotate about more than a single rotational axis.

In at least one embodiment, the user may select the transition of the operational mode, via verbally speaking voice-activated commands, such as but not limited to "display mode," "projection mode," and the like. Such voice activated commands may be detected via electroacoustic transducers, such as but not limited primary microphone 332 and/or auxiliary microphones 334. In some embodiments, a first subset of the set available microphones may be operated when HMD device 320 is operated in the display mode. A second subset of the set available microphones may be operated when HMD device 320 is operated in the projection mode. In some embodiments, the intersection of the two subsets of the set of available microphones is the empty set. In other embodiments, the intersection of the two subsets of available microphones includes one or more microphones.

For example, during operation in the display mode, in some embodiments, only the primary microphone 332 is operated and/or activated. Because rotation of the boom arm (first/second rotating members 326/328) may displace primary microphone 332 away from the user's mouth, at least a portion of the auxiliary microphones 334 may be operated and/or activated during the projection mode. In some embodiments, primary microphone 332 may be continued to be operated and/or activated during the projection mode. In other embodiments, primary microphone 332 may not be operated during projection mode.

Figure 4A:
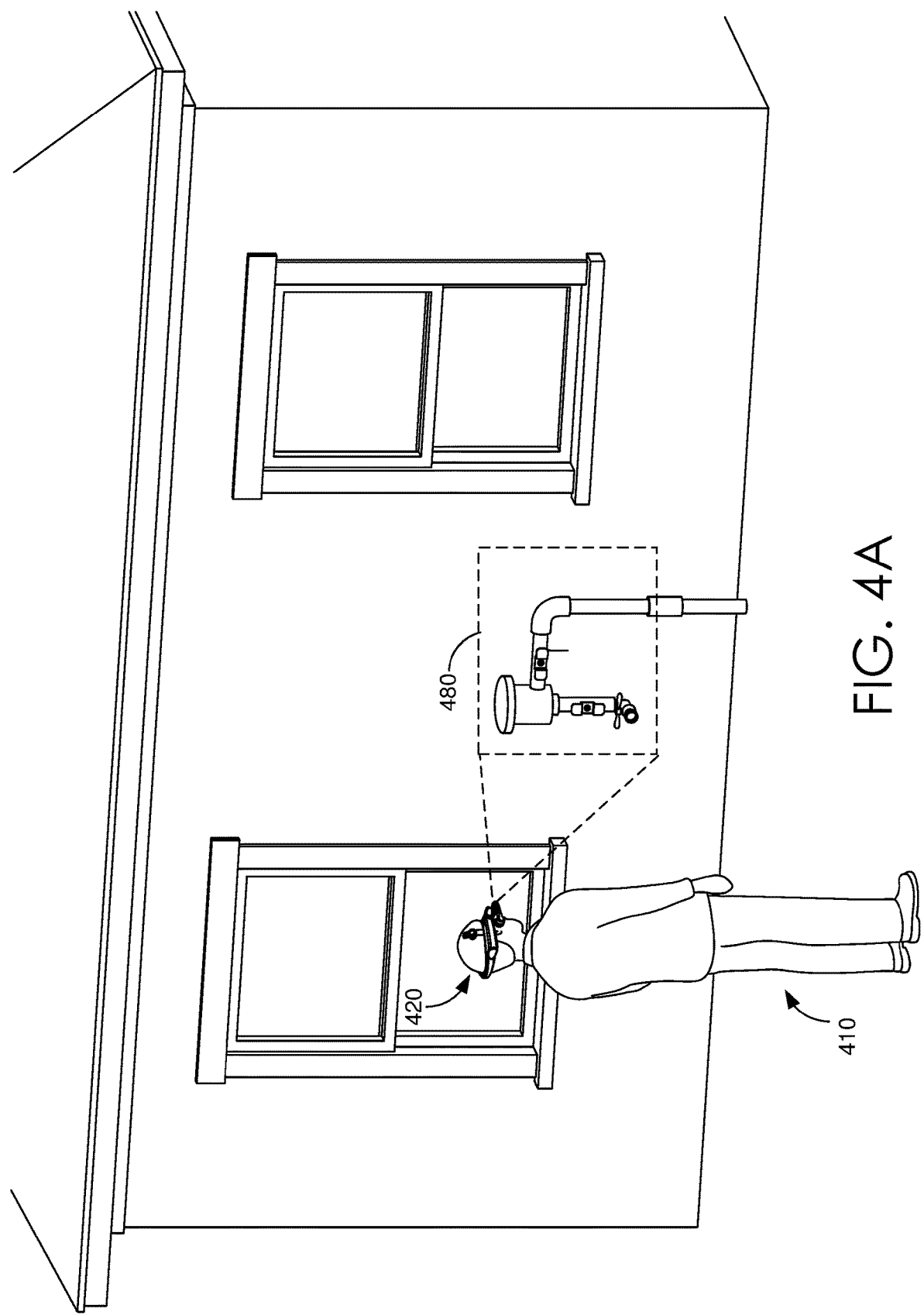
FIG. 4A shows a user employing a wearable device, in accordance with some of the implementations of the present disclosure.
Figure 4B:
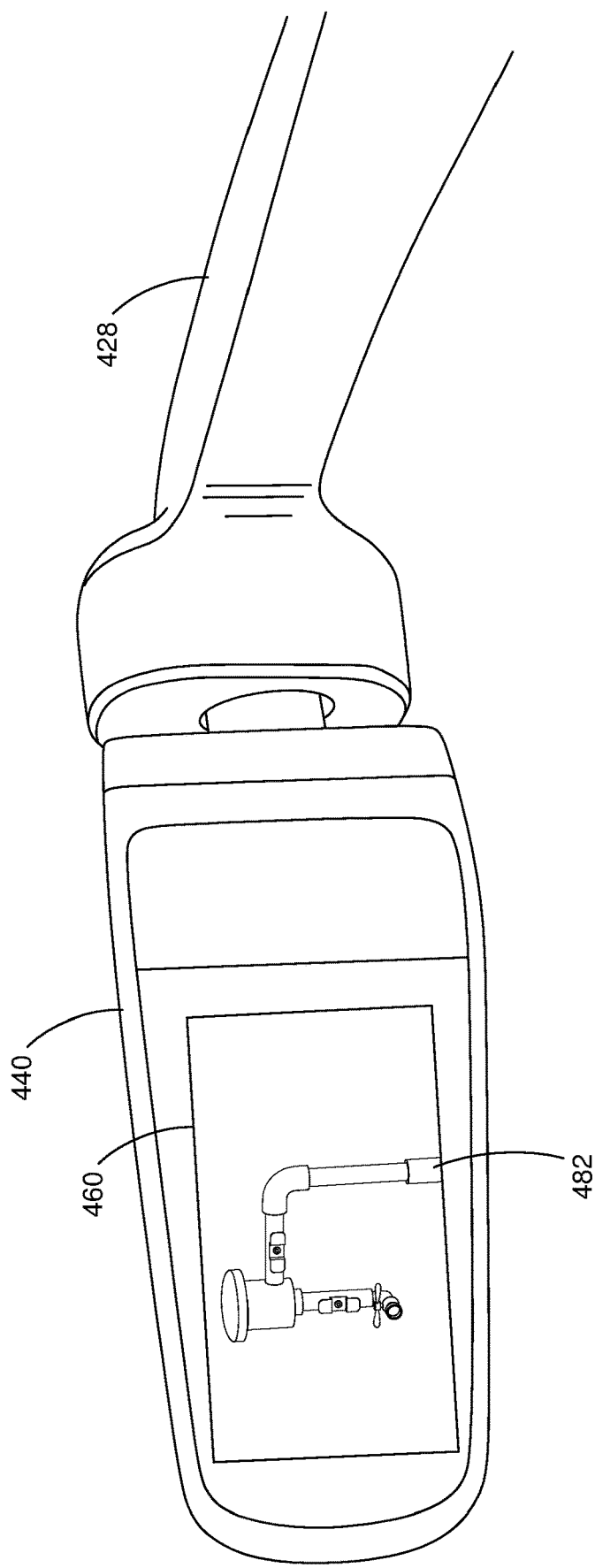
FIG. 4B shows a display device of the wearable device of FIG. 4A displaying image, in accordance with some of the implementations of the present disclosure.

FIG. 4A shows a user 410 employing a wearable device 420, in accordance with some of the implementations of the present disclosure. Wearable device 420 may be similar to wearable device 120 of FIG. 1, HMD device 220 of FIG. 2 and/or HMD device 320 of FIGS. 3A-3B. More particularly, in FIG. 4A, a photon-detector (e.g. a camera) of wearable device 420 is generating image data that encodes a field-of-view 480 (FOV) of the photon-detector. FIG. 4B shows a display device 460 of the wearable device 420 of FIG. 4A displaying image data 482, in accordance with some of the implementations of the present disclosure. Display device 460 may be housed in a display module 440 that is supported by a first rotating member 428 of the wearable device 420. As shown in FIG. 4B, display device 460 is displaying the image data 482 generated in FIG. 4A. That is, the displayed image data 482 encodes the FOV 480 of the photon-detector of the wearable device 420.

Figure 5A:
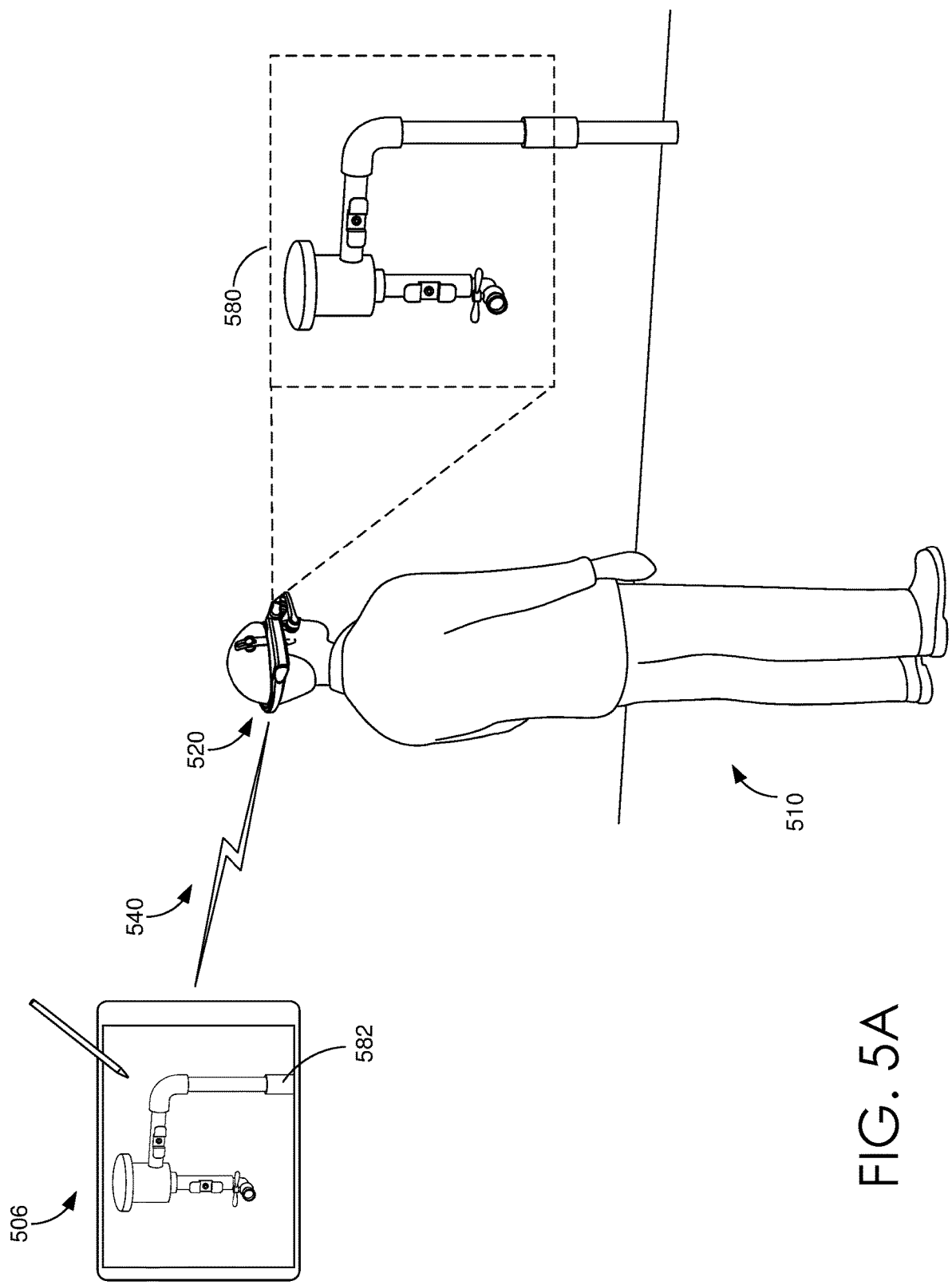
FIG. 5A shows a user employing a wearable device to provide a remote computing device image data generated by a photon-detector of the wearable device, in accordance with some of the implementations of the present disclosure.

FIG. 5A shows user 510 employing a wearable device 520 to provide a remote computing device 506 image data 582 generated by a photon-detector of the wearable device 520, in accordance with some of the implementations of the present disclosure. More particularly, image data 582 is generated by the photon-detector and encodes the FOV 580 of the photon-detector. A communication session 540 is employed to provide the generated image data 582 to remote computing device 506. Communication session 540 may be enabled via a communication network, such as but not limited to communication network 110 of FIG. 1. Remote computing device 506 may include virtually any computing device, such as but not limited to tablet 106 or any other computing device of FIG. 1. The provided image data 582 is displayed by a display device of remote computing device 506. Thus, the user of remote computing device 506 is enabled to view, in real-time, the FOV 580 of the photon-detector of wearable device 520, via the communication session 540.

Figure 5B:
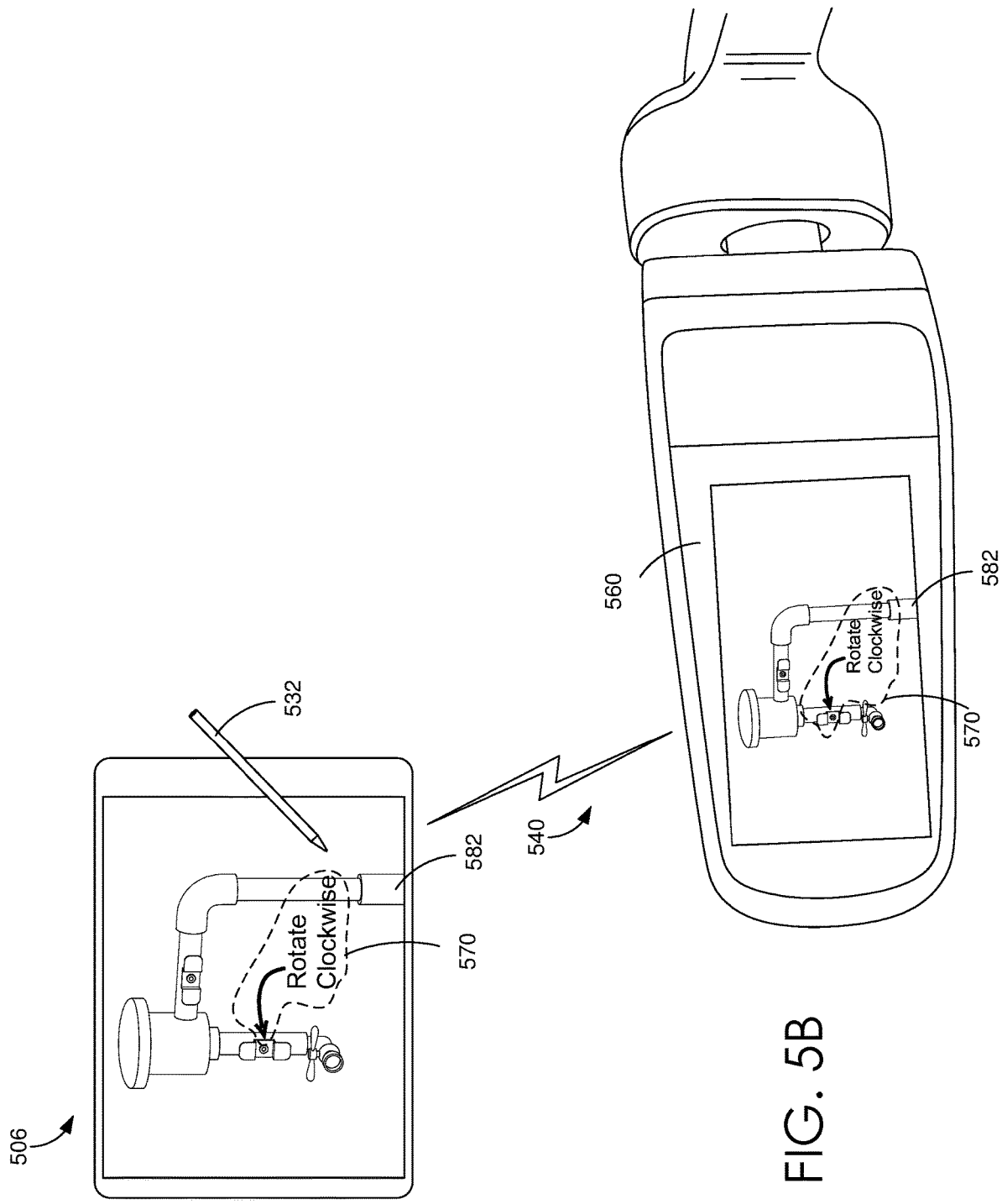
FIG. 5B shows a display device of a wearable device displaying telestrations provided by the remote computing device of FIG. 5A, in accordance with some of the implementations of the present disclosure.

FIG. 5B shows a display device 560 of the wearable device 520 displaying telestrations provided by the remote computing device 506 of FIG. 5A, in accordance with some of the implementations of the present disclosure. In various embodiments, display device 560 is within the line-of-sight (LOS) of user 510 of FIG. 5A. More particularly, when viewing image data 582, a user of remote computing device 506 may employ stylus 532 to sketch or otherwise provide visual elements 570 on a touch-sensitive display device of remote computing device 506. Visual elements 570 may be telestrations. In the example of FIG. 5B, such telestrations include text and a directional arrow to direct or provide guidance for the actions of user 510 of the wearable device 520. In various embodiments, the user of the remote computing device 506 may be an annotator.

In some embodiments, communication session 540 is employed to provide wearable device 520 an instruction (or a request) to provide such telestrations to user 510. In various embodiments, such as that shown in FIG. 5B, the instruction may be to provide visual elements 570 on display device 560 of wearable device 520. In other embodiments, such as those discussed in conjunction with at least FIGS. 6 and 7, the instruction may be to project various visual elements on surfaces of the environment of user 510. That is, wearable device 520 may be operated in a display mode or a projection mode.

In the display mode shown in FIG. 5B, visual elements 570 are combined, superimposed, composited, blended, or layered on the image data 582 displayed by display device 560. In the various embodiments, the display device of remote computing device 506 and display device 560 of the wearable device 520 display, in real-time (or near real-time), the same compositing of visual elements 570 and image data 582. Accordingly, the user of remote computing device 506 is enabled to provide real-time telestrations, via display device 560, that are superimposed on image data 582 that encodes the FOV 580 of the photon-detector of the wearable device 520.

Figure 6:
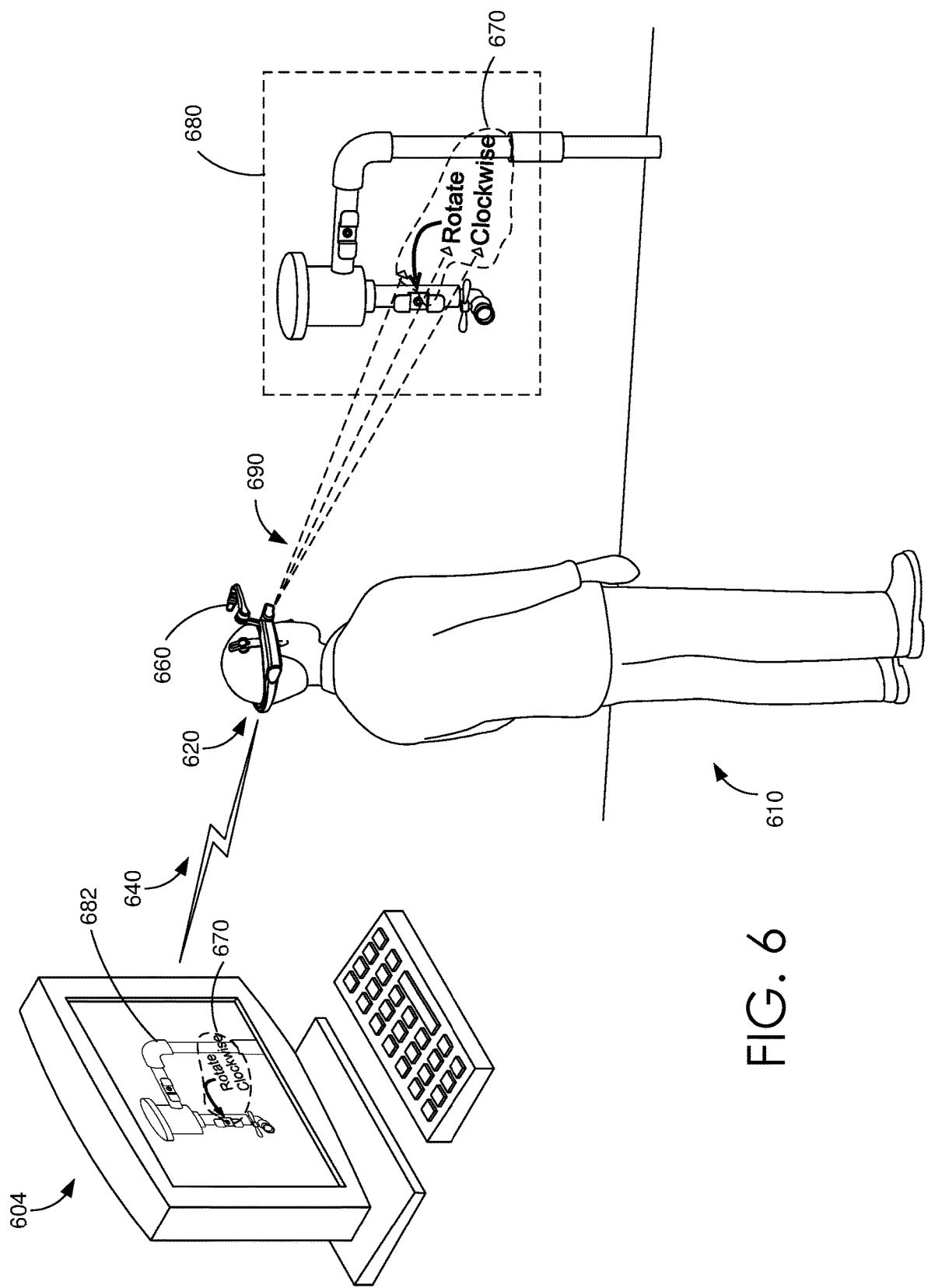

FIG. 6 shows a wearable device 620 projecting telestrations onto physical surfaces of the user's 610 environment, in accordance with some of the implementations of the present disclosure. More particularly, image data 682 is generated that encodes the photon-detector's FOV 680. A communication session 640 is employed to provide the generated image data 682 to remote computing device 604. Remote computing device may include virtually any computing device, such as but not limited to desktop 104 of FIG. 1. The provided image data 682 is displayed by a display device of remote computing device 604. Accordingly, when viewing image data 682, a user of remote computing device 604 may provide visual elements 670 to annotate, or otherwise provide visual cues for, image data 682. That is, the user of remote computing device 604 is enabled to generate telestrations in real-time. Thus, the user of the remote computing device 604 may be an annotator.

In some embodiments, communication session 640 is employed to provide wearable device 620 an instruction (or a request) to provide such telestrations to user 610. In various embodiments, such as that shown in FIG. 5B, the instruction may be to provide visual elements 570 to user 610. In various embodiments, display device 660 is outside the line-of-sight (LOS) of user 610. When display device is outside the LOS of user 610, visual elements 670 may be projected onto surfaces of the user's environment, by a projection system included in wearable device 620. That is, as shown in FIG. 6, wearable device 620 is operated in a projection mode.

In the projection mode shown in FIG. 6, a photon-emitter included in the projection system of wearable device 620 is employed to transmit photon beams 690 such that visual elements 670 are projected onto a surface of the environment of user 610. Note that the user of remote computing device 604 generates visual elements 670 in a particular location of the FOV 680 of the photon-detector of wearable device 620. Thus, the instruction provided to wearable device 620 may be to provide visual elements 670 in the same particular location of the FOV 680 of the photon-detector of wearable device 620. In the various embodiments, visual elements 670 are projected, via photon beams 690, in real-time (or near real-time) as the display device of remote computing device 604 is compositing visual elements 670 and image data 682. Accordingly, the user of remote computing device 604 is enabled to provide real-time telestrations to user 610 of wearable device 620. More particularly, the telestrations are projected, via the projection system of wearable device 620, onto surfaces of particular locations of the FOV 680 of the photon-detector of the wearable device 620.

Figure 7:
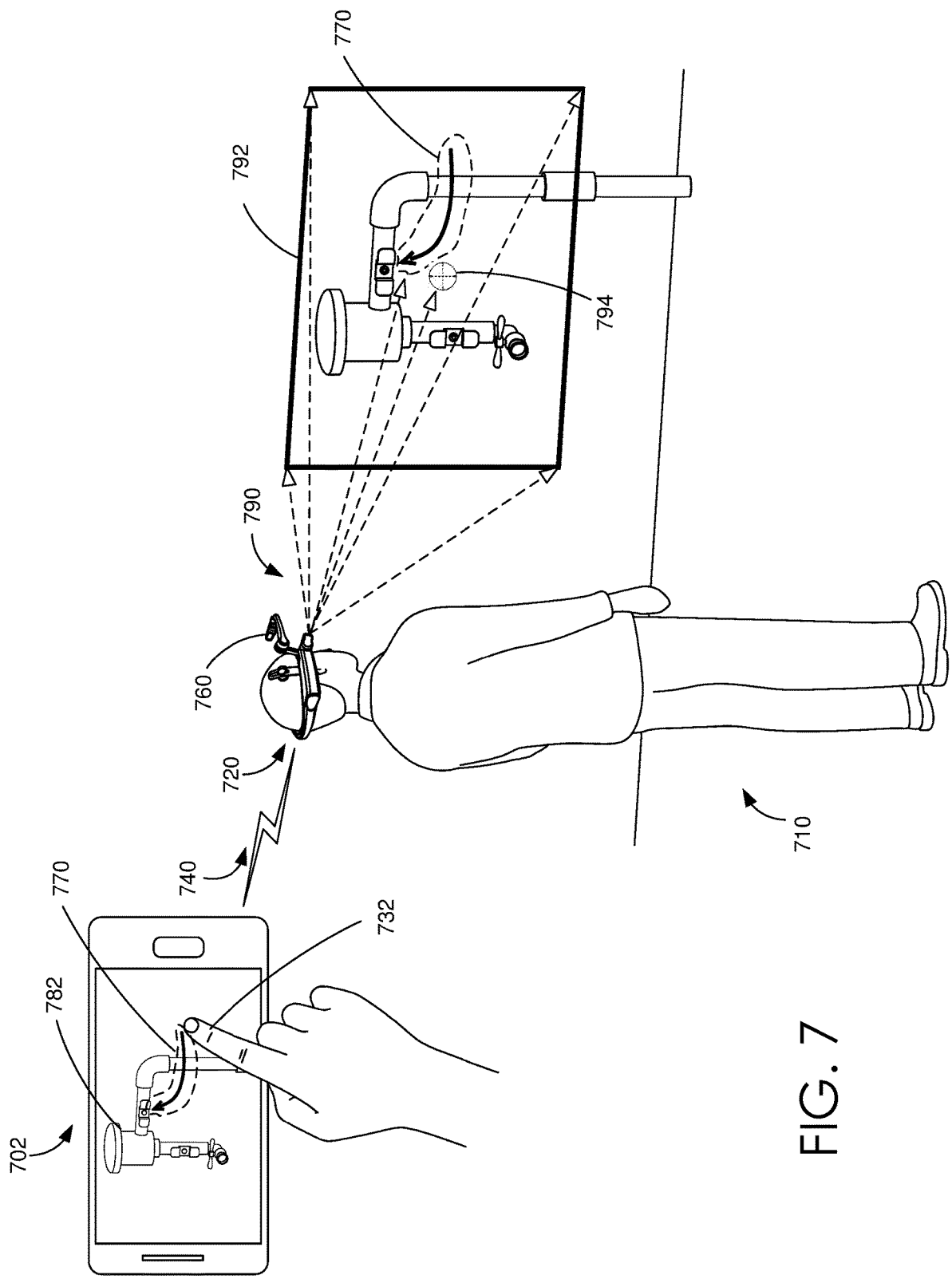
FIG. 7 shows a wearable device projecting telestrations onto physical surfaces of the user's environment to indicate the field-of-view of a photon-detector of the wearable device, in accordance with some of the implementations of the present disclosure.

FIG. 7 shows a wearable device 720 projecting telestrations onto physical surfaces of the user's environment to indicate the FOV of a photon-detector of the wearable device 720, in accordance with some of the implementations of the present disclosure. Similar to FIG. 6, the display device 760 of wearable device 720 is outside the LOS of user 710. Thus, in FIG. 7, wearable device 720 is operated in a projection mode. Again, similar to the embodiments discussed in conjunction with FIG. 6, image data 782 is generated, via a photon-detector of wearable device 720, and provided (via communication session 740) to remote computing device 702. Remote computing device 702 may be a smartphone, such as but not limited to smartphone 102 of FIG. 1.

When viewing image data 782, the user of remote computing device 702 may provide visual elements 770, via fingertip gestures 732 on a touch-sensitive display device of remote computing device 702. The visual elements 770 are located in a particular position of the FOV of the photon-detector of wearable device 720, based on the locations of the fingertip gestures 732 on the touch-sensitive display device. The user of the remote computing device 702 may be an annotator.

Wearable device 720 may receive an instruction to provide the visual elements 770 at the particular location within the FOV of the photon-detector of wearable device 720. Similar to FIG. 6, a projection system of wearable device 720 may employ a photon-emitter, such as but not limited to a coherent photon source (e.g. a scanning laser) to transmit photon beams 790. In other embodiments, the projection system includes a light emitting diode (LED) as a scanning photon-emitter. Photon beams 790 are transmitted such that visual elements 770 are projected onto surfaces of the particular location within the FOV of the photon-detector of wearable device 720.

In addition to projecting visual elements 770, the photon beams 790 may be transmitted to project additional visual elements to indicate at least the boundary and/or the center of the FOV of the photon-detector. In FIG. 7, the transmission of photon beams 790 project bounding box 792 on surfaces located at the boundary of the FOV of the photon-detector of wearable device 720. Additionally, bullseye 794 (or other visual elements such as a dot or cursor) is projected onto surfaces located at the center of the FOV of the photon-detector. When display device 760 is outside the LOS of user 710, such additionally projected visual elements may indicate the boundaries and/or the center of the FOV of the photon-detector. User 710 may find such indications useful when not viewing display device 760. For instance, user 710 may observe, in their environment, at least the boundaries of the image data 782 being generated and provided to remote computing device 702.

As discussed in conjunction with FIGS. 8A-9B below, computer and/or machine vision may be employed to track objects within the FOV of a photon-detector of a wearable device. Visual elements may be projected and/or displayed to indicate the location of the object within the FOV, as the object and/or the user of the wearable device moves through the environment. That is, the user wearing the wearable device may move relative to an object in the environment, the object may move relative to the user, or a combination thereof, and the position of the object, relative to the user is tracked during such motion. By tracking the position of one or more objects, the position of the projected visual elements may be maintained. Such tracking may be enabled via the generation of a three-dimensional (3D) map of the user's environment. More specifically, the photon-detector may include a depth-sensing camera (e.g., a 3D camera) or another depth sensor. A 3D map of the FOV of the of the depth-sensing camera may be generated based on image data captured and/or generated by the depth-sensing camera. As shown in FIGS. 8A-9B, the position of the projected visual elements, relative to the tracked objects, may be maintained based on the 3D map.

Figure 8B:
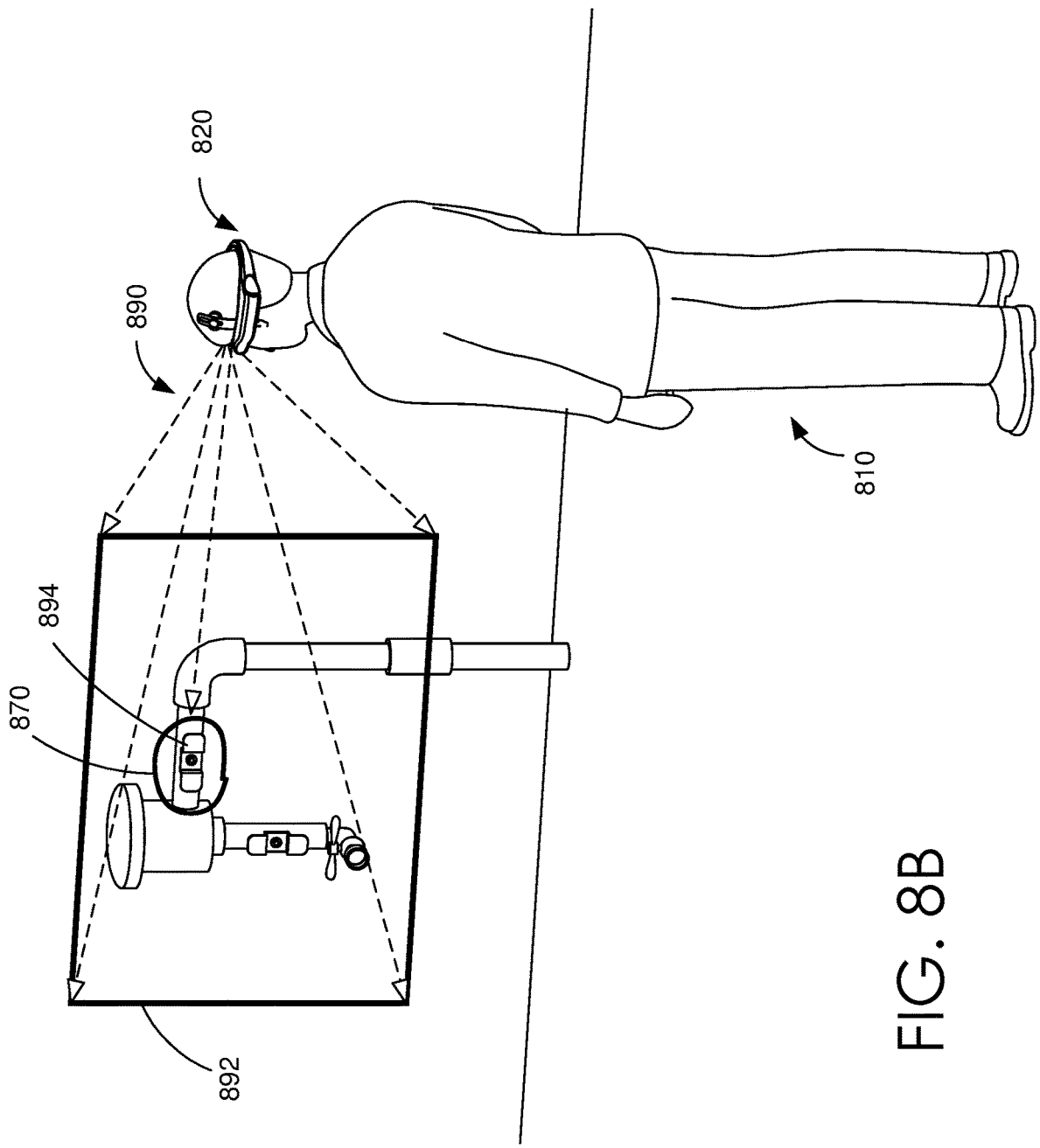

FIGS. 8A-8B show a wearable device 820 projecting telestrations to indicate an object 894 in the user' environment while the user 810 in is motion relative to the object 894, in accordance with some of the implementations of the present disclosure. More particularly, communication session 840 is employed to provide image data 882 to remote computing device 808, such as but not limited to a laptop computing device. As with other embodiments discussed throughout, the image data 882 is of the FOV of a photon-detector of wearable device 820.

A user of remote computing device 808 may generate an instruction to indicate an object 894 within the FOV of the photon-detector of wearable device 820 (i.e. the FOV is encoded in image data 882). In the non-limiting embodiment of FIG. 8A, object 894 is a valve handle. The instruction may be provided to wearable device 820, via communication session 840 to provide a visual element to user 810 to indicate a location of object 894. A computer-vision engine or module included in wearable device 820 (or another computing device such as but not limited to remote computing device 808) may be employed to select a portion of image data 882 that encodes the object 894. The computer-vision engine may determine the location (that is associated with object 894) in the FOV of the photon-detector based on the selected portion of image data 882.

Photon beams 890 may be transmitted (via a projection system of wearable device 820) to project visual element 870 to indicate at least a location of object 894 at the determined location within the FOV of the photon-detector. That is, computer vision (and/or machine vision) may be employed to locate a selected object within image data, and provide projected telestrations to indicate the object. Such computer vision may be employed to provide visual elements composited on display devices, such as visual element 870 shown on the display device of remote computing device 808. Although not shown in FIG. 8, computer vision may also be employed to display such telestrations on the display device of wearable device 820. In addition to projected visual element 870, bounding box 892 may be projected to indicate the boundary of the FOV of the photon-detector of wearable device 820.

In FIG. 8B, user 810 has moved (i.e. walked) to another location in their environment. As the user walks around their environment and in real-time, the computer-vision engine tracks the location of object 894 (within the FOV of the photon-detector), such that the transmission of photon beams 890 is updated. That is, the projections of visual element 870 is continually adjusted and/or updated such that the projected visual element 770 continually indicates object 894, as the user walks through their environment. The projection of bounding box 892 may be updated to indicate the variance in the FOV of the photon-detector, as user 810 walks through their environment.

More particularly, as discussed above, wearable device 820 may include a depth-sensing camera, such as but not limited to a 3D camera. A 3D map of the user's environment may be generated based on image data generated by the depth-sensing camera. The computer-vision engine may employ the 3D map of the user's environment to track the location of at least object 894 within the FOV of the depth-sensing camera. Based on tracking the location of object 894, the position of the projected visual element 870, relative to tracked object 894, may be maintained based on the computer-vision engine employing the 3D map.

Figure 9A:
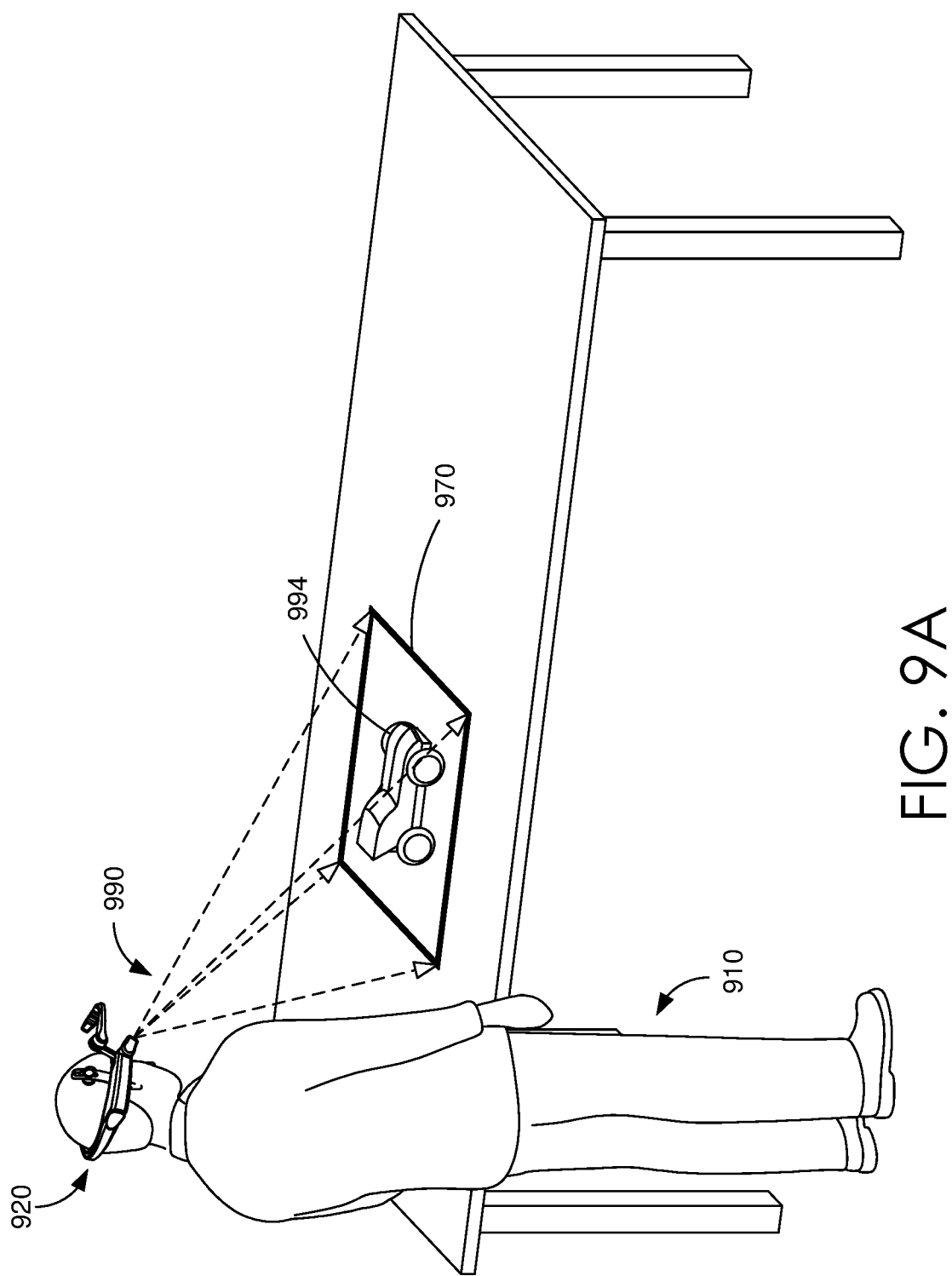
FIGS. 9A-9B show a wearable device projecting telestrations to indicate an object in the user's environment while the object in is motion relative to the user, in accordance with some of the implementations of the present disclosure.
Figure 9B:
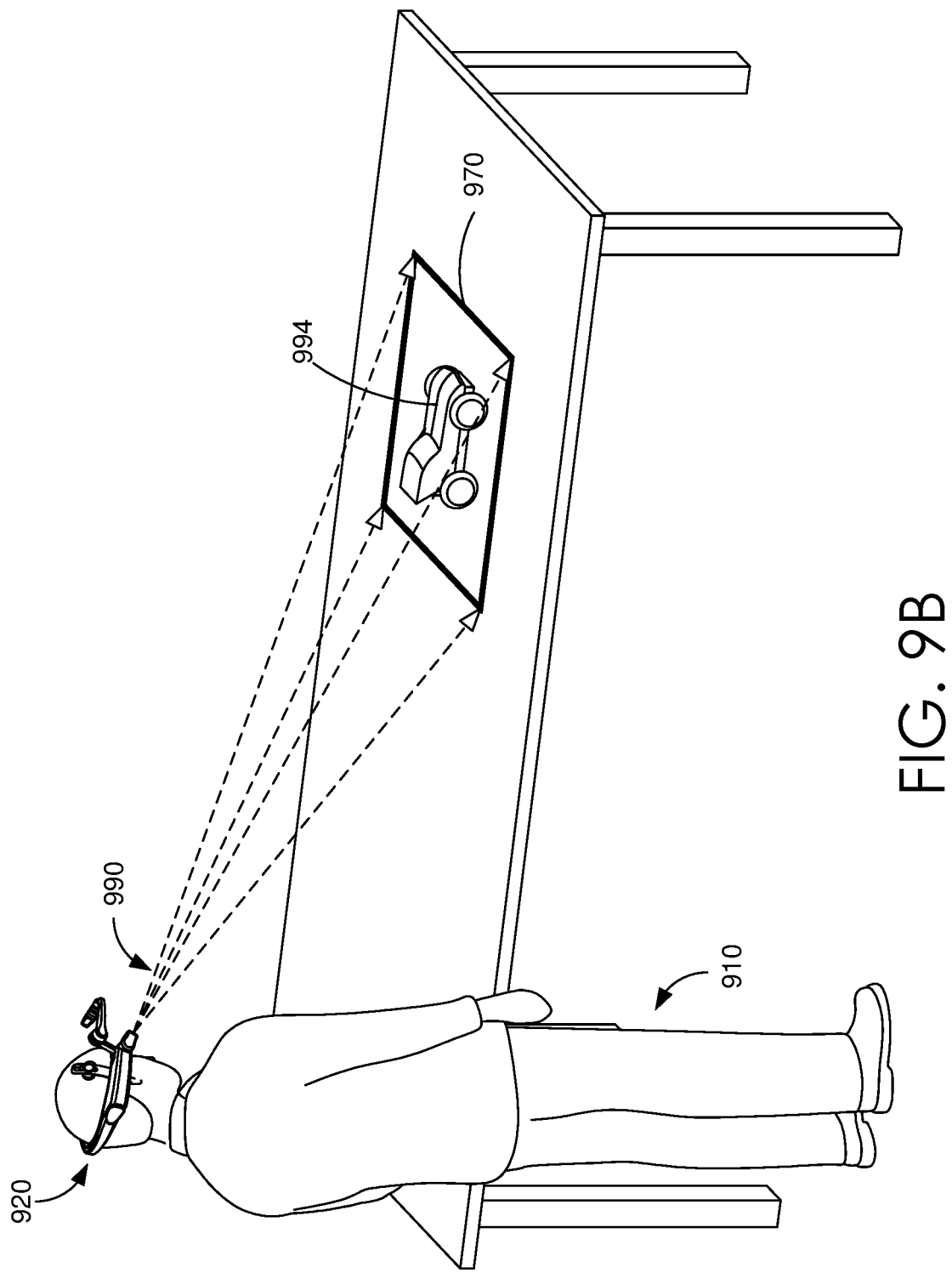

FIGS. 9A-9B show a wearable device 920 projecting telestrations to indicate a location of an object 994 in the user's 910 environment while the object 994 in is motion relative to the user 910, in accordance with some of the implementations of the present disclosure. Similar to FIGS. 8A-8B, a computer-vision engine is employed to track an object 994 (e.g. a remote controlled car). As discussed in conjunction with at least FIGS. 8A-8B, a 3D map of the user's environment may be generated based on image data generated and/or captured by a depth-sensing camera included in wearable device 920. The computer-vision engine may track the relative motion between objects and the user via the 3D map. That is, the computer-vision engine may employ the 3D map to enable the maintaining of the location of projected visual elements, relative to objects within the user's environment.

In contrast to FIGS. 8A-8B, in FIGS. 9A-9B, the object 994 is moving relative to the user, i.e. the user 910 is stationary and the object 994 is in motion with respect to their environment. In at least one embodiment, both the user 910 and the object 994 are in motion relative to the environment. In FIG. 9B, the object 994 has moved, relative to the view of FIG. 9A. FIG. 9B shows the updating of the transmission of photon beams 990, such that projected visual element 970 continues to indicate a location of object 994 within the FOV of the photon-detector of wearable device 920, as the object 994 moves relative to user 910.

Figure 10:
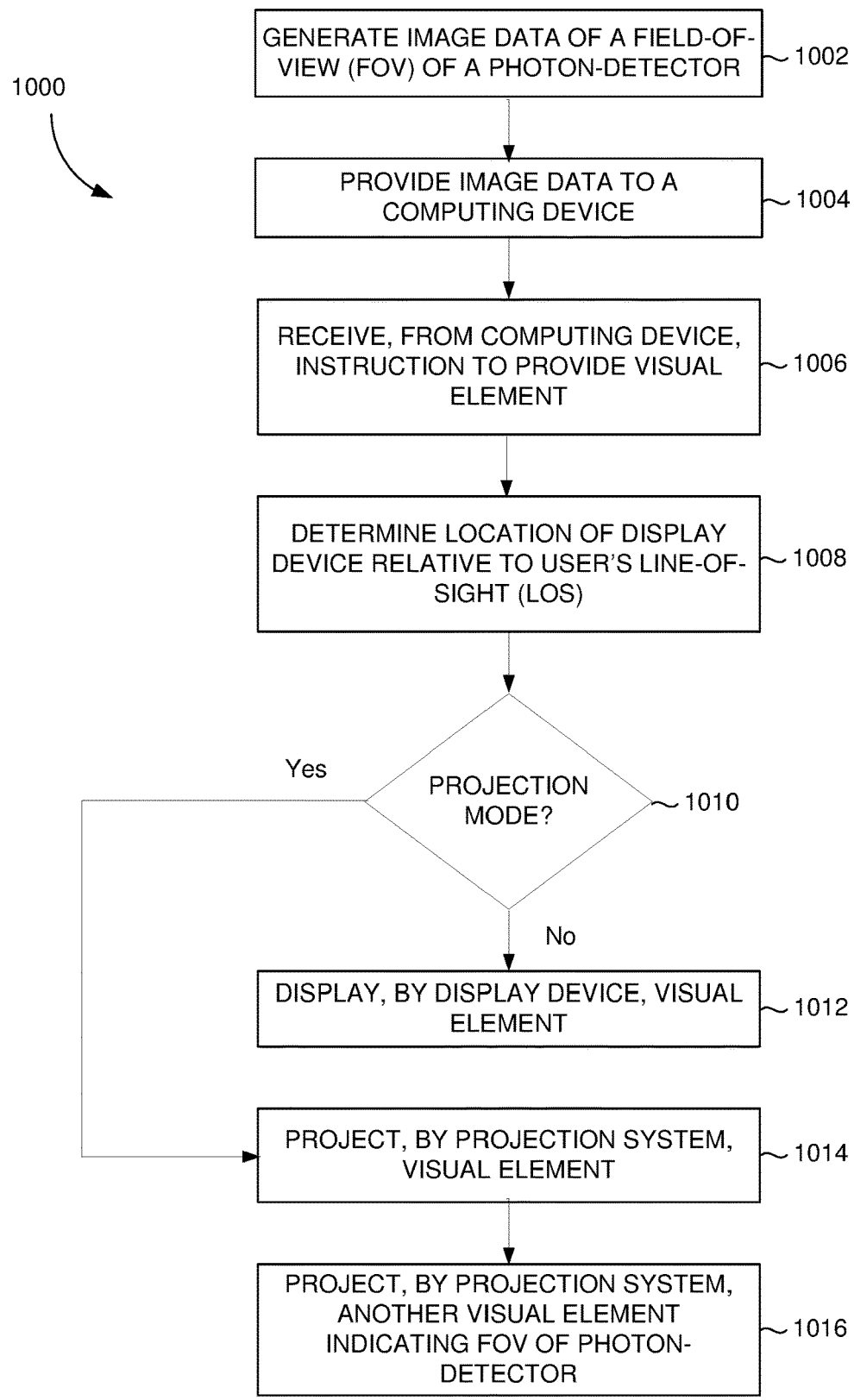
FIGS. 10-11 provide illustrative process flows depicting a method for operating a wearable device, in accordance with some implementations of the present disclosure.
Figure 11:
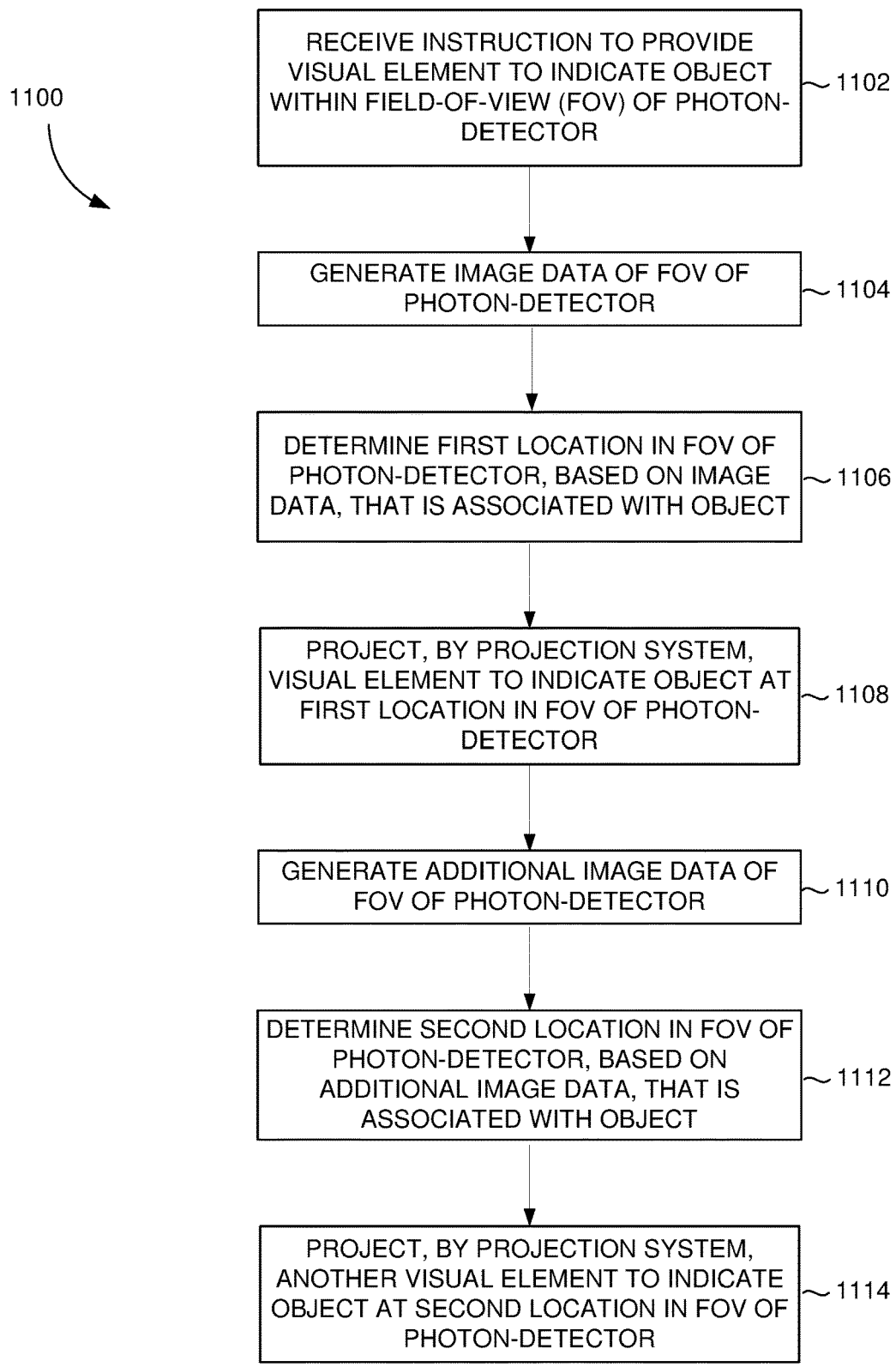

Having described various aspects of the present disclosure, exemplary methods are described below in for operating a wearable device. Referring to FIGS. 10-11 in light of FIGS. 1-9B, FIGS. 10-11 provide illustrative process flows depicting various methods for operating a wearable device, in accordance with some implementations of the present disclosure. Each block of below methods (1000 and 1100) and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Process 1000 of FIG. 10 begins at block 1002. At block 1002, image data is generated of a field-of-view (FOV) of a photon-detector (e.g. a camera) included in a computing device, such as but not limited to a wearable device. In at least one embodiment, the computing device may be a networked computing device. For example, a camera included in wearable device 120 of FIG. 1 may generate image data that encodes the FOV of the camera. The wearable device may be a HMD device, such as HMD device 220 of FIG. 2 and/or HMD device 330 of FIGS. 3A-3B. At block 1004, the image data is provided to another computing device, such as but not limited to at least one of computing devices 102-108 of FIG. 1. A communication network, such as but not limited to communication network 110 of FIG. 1 may enable the providing of the image data.

At block 1006, an instruction (or request) may be received from the other computing device. In at least one alternative embodiment, at block 1006, the instruction is generated by a first component of the wearable device and received by a second component of the wearable device. The instruction may be to provide a visual element at a particular location within the FOV of the photon-detector. At block 1008, the location (or position) of a display device of the wearable device, relative to a line-of-sight (LOS) of the user of the wearable device, may be automatically determined. The relative location of the display device may be determined based on a signal generated by a position-detecting sensor and/or switch included in the wearable device, such as but not limited to a Hall Effect switch or sensor included in the wearable device. Other position-detecting sensors and/or switches include optical sensors, electrical sensors, magnetic sensors, mechanical sensors, and the like.

At decision block 1010, it is determined whether to operate the wearable device in a projection mode. The determination of whether to operate the wearable device in the projection mode may be based on the location of the display device relative to the LOS of the user. For instance, if the location of display device is outside of or excluded from the LOS of the user, the wearable device may be operated in projection mode. If operated in projection mode, process 1000 flows to block 1014. Otherwise, the wearable device may be operated in a display mode and process 1000 flows to block 1012.

At block 1012, the visual element is displayed by the display device of the wearable device. In at least one embodiment, a combination, blend, composite, or layering of the image data and the visual element is displayed by the display device. The visual element may be displayed at a location on the display device that corresponds to the particular location within the FOV of the photon-detector, as indicated in the instruction received at block 1006.

At block 1014, the visual element may be projected via a projection system included in the wearable device. More specifically, a scanning photon-emitter included in the projection system may transmit photon beams such that the visual element is projected onto a surface at the particular location within the FOV of the photon-detector. The photon-emitter may include a collimated photon source, such as but not limited to a light emitting diode (LED). In another embodiment, the photon-emitter may include a coherent photon source, such as a laser source.

At block 1016, the projection system projects another visual element to indicate the FOV of the photon-detector. For instance, photon beams may be transmitted, via the photon-emitter, such that another visual element (e.g. a bounding box) is projected onto a surface that is located at the boundary of the FOV of the photon-detector. In at least one embodiment, the photon beams are transmitted such that another indicator (e.g. a "bullseye" or a dot) is projected onto a surface that is located at the center of the FOV of the photon-detector.

Process 1100 of FIG. 11 begins at block 1102. At block 1102, an instruction to provide a visual element to indicate an object within a FOV of a photon-detector of a wearable device is received. As discussed in conjunction with at least process 1000, at block 1102, the instruction may be received from another computing device or generated by a first component of the wearable device and received by a second component of the wearable device. At block 1104, image data of the FOV of the photon-detector is generated, i.e. image data that encodes the FOV is generated.

At block 1106, a computer-vision engine (or module) is employed to determine a first location within the FOV of the photon-detector (that is associated with the object). The determination of the first location is based on the image data. That is, computer and/or machine vision may be employed to determine a first location of an object within the image data. At block 1108, the projection system of the wearable device is employed to project a visual element, at the first location within the FOV of the photon-detector, to indicate the object.

At block 1110, additional image data may be generated of the FOV of the photon-detector. For instance, the user of the wearable object and/or the object may have moved since the generation of the previous image data. Thus, the (second) FOV of the photon-detector may be updated, relative to the previous (first) FOV of the photon-detector.

At block 1112, the computer-vision engine is employed to determine a second location within the updated FOV of the photon-detector (that is associated with the object). The determination of the second location is based on the additional image data. That is, computer and/or machine vision may be employed to determine a second location of an object within the additional image data. At block 1114, the projection system of the wearable device is employed to project another visual element, at the second location within the updated FOV of the photon-detector, to indicate an updated location of the object.

Having described embodiments of the present invention, an example operating environment in which embodiments of the present invention may be implemented is described below in order to provide a general context for various aspects of the present invention.

Figure 12:
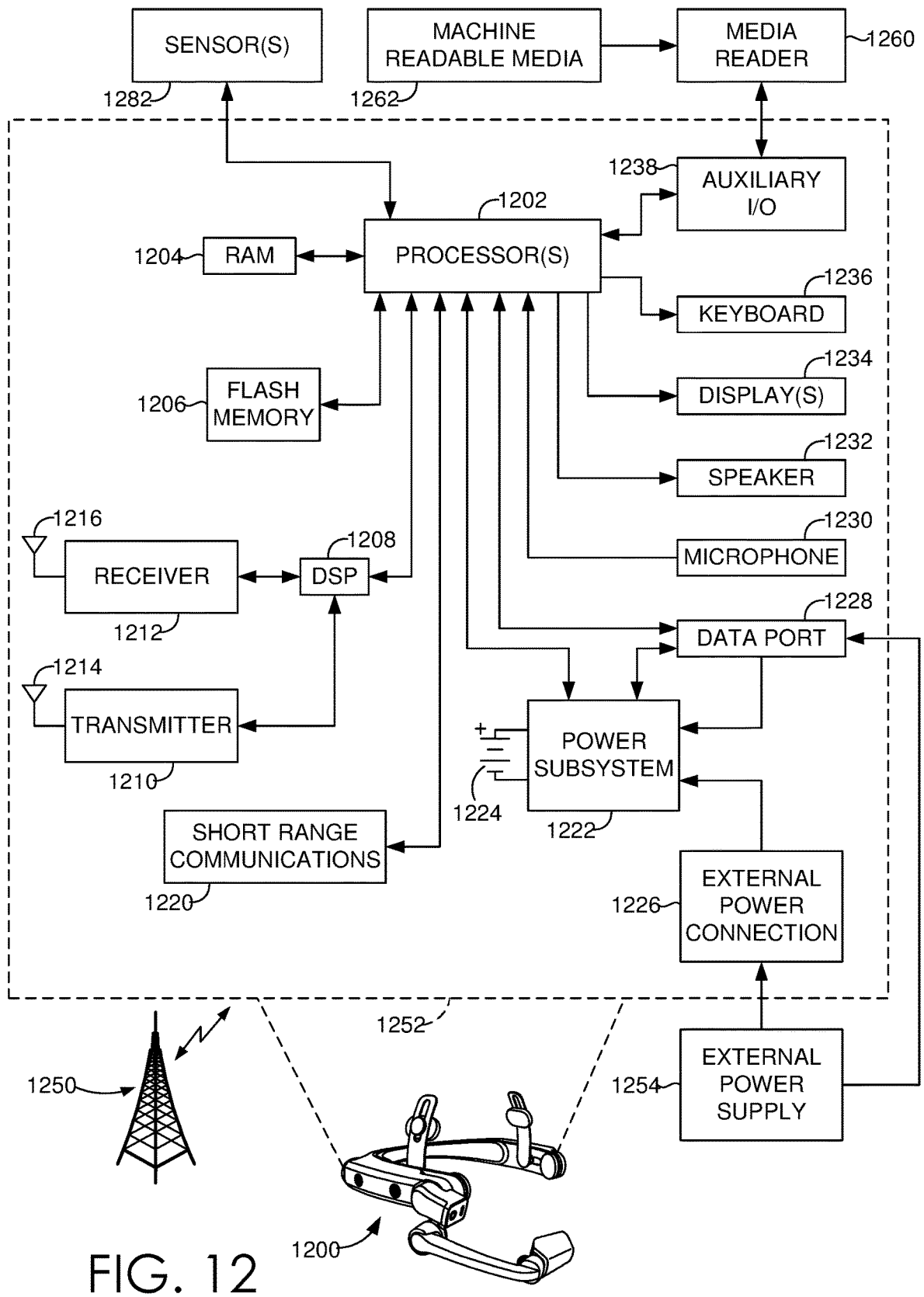
FIG. 12 provides a block diagram of an exemplary wearable device in which some implementations of the present disclosure may be employed.

FIG. 12 provides a block diagram of an exemplary wearable device 1200 in which some implementations of the present disclosure may be employed. Any of the various embodiments of wearable devices discussed herein, including but not limited to HMD device 120, 220, or 320 of FIGS. 1, 2, and 3A respectively, may include similar features, components, modules, operations, and the like as wearable device 1200. In this example, wearable device 1200 may be enabled for wireless two-way communication device with voice and data communication capabilities. Such wearable devices communicate with a wireless voice or data network 1250 using a suitable wireless communications protocol. Wireless voice communications are performed using either an analog or digital wireless communication channel. Data communications allow the wearable device 1200 to communicate with other computer systems via the Internet. Examples of wearable devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated wearable device 1200 is an exemplary wearable device that includes two-way wireless communications functions. Such wearable devices incorporate communication subsystem elements such as a wireless transmitter 1210, a wireless receiver 1212, and associated components such as one or more antenna elements 1214 and 1216. A digital signal processor (DSP) 1208 performs processing to extract data from received wireless signals and to generate signals to be transmitted. The particular design of the communication subsystem is dependent upon the communication network and associated wireless communications protocols with which the device is intended to operate.

The wearable device 1200 includes a microprocessor 1202 that controls the overall operation of the wearable device 1200. The microprocessor 1202 interacts with the above described communications subsystem elements and also interacts with other device subsystems such as flash memory 1206, random access memory (RAM) 1204, auxiliary input/output (I/O) device 1238, data port 1228, display 1234, keyboard 1236, speaker 1232, microphone 1230, a short-range communications subsystem 1220, a power subsystem 1222, and any other device subsystems.

A battery 1224 is connected to a power subsystem 1222 to provide power to the circuits of the wearable device 1200. The power subsystem 1222 includes power distribution circuitry for providing power to the wearable device 1200 and also contains battery charging circuitry to manage recharging the battery 1224. The power subsystem 1222 includes a battery monitoring circuit that is operable to provide a status of one or more battery status indicators, such as remaining capacity, temperature, voltage, electrical current consumption, and the like, to various components of the wearable device 1200.

The data port 1228 is able to support data communications between the wearable device 1200 and other devices through various modes of data communications, such as high speed data transfers over an optical communications circuits or over electrical data communications circuits such as a USB connection incorporated into the data port 1228 of some examples. Data port 1228 is able to support communications with, for example, an external computer or other device.

Data communication through data port 1228 enables a user to set preferences through the external device or through a software application and extends the capabilities of the device by enabling information or software exchange through direct connections between the wearable device 1200 and external data sources rather than via a wireless data communication network. In addition to data communication, the data port 1228 provides power to the power subsystem 1222 to charge the battery 1224 or to supply power to the electronic circuits, such as microprocessor 1202, of the wearable device 1200.

Operating system software used by the microprocessor 1202 is stored in flash memory 1206. Further examples are able to use a battery backed-up RAM or other non-volatile storage data elements to store operating systems, other executable programs, or both. The operating system software, device application software, or parts thereof, are able to be temporarily loaded into volatile data storage such as RAM 1204. Data received via wireless communication signals or through wired communications are also able to be stored to RAM 1204.

The microprocessor 1202, in addition to its operating system functions, is able to execute software applications on the wearable device 1200. A predetermined set of applications that control basic device operations, including at least data and voice communication applications, is able to be installed on the wearable device 1200 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the wearable device 1200 through, for example, the wireless network 1250, an auxiliary I/O device 1238, Data port 1228, short-range communications subsystem 1220, or any combination of these interfaces. Such applications are then able to be installed by a user in the RAM 1204 or a non-volatile store for execution by the microprocessor 1202.

In a data communication mode, a received signal such as a text message or web page download is processed by the communication subsystem, including wireless receiver 1212 and wireless transmitter 1210, and communicated data is provided to the microprocessor 1202, which is able to further process the received data for output to the display 1234, or alternatively, to an auxiliary I/O device 1238 or the data port 1228. A user of the wearable device 1200 may also compose data items, such as e-mail messages, using the keyboard 1236, which is able to include a complete alphanumeric keyboard or a telephone-type keypad, in conjunction with the display 1234 and possibly an auxiliary I/O device 1238. Such composed items are then able to be transmitted over a communication network through the communication subsystem.

For voice communications, overall operation of the wearable device 1200 is substantially similar, except that received signals are generally provided to a speaker 1232 and signals for transmission are generally produced by a microphone 1230. Alternative voice or audio I/O subsystems, such as a voice message recording subsystem, may also be implemented on the wearable device 1200. Although voice or audio signal output is generally accomplished primarily through the speaker 1232, the display 1234 may also be used to provide an indication of the identity of a calling party, the duration of a voice call, or other voice call related information, for example.

Depending on conditions or statuses of the wearable device 1200, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1220 provides for data communication between the wearable device 1200 and different systems or devices, which need not necessarily be similar devices. For example, the short-range communications subsystem 1220 includes an infrared device and associated circuits and components or a Radio Frequency based communication module such as one supporting Bluetooth® communications, to provide for communication with similarly-enabled systems and devices, including the data file transfer communications described above.

A media reader 1260 connectable to an auxiliary I/O device 1238 to allow, for example, loading computer readable program code of a computer program product into the wearable device 1200 for storage into flash memory 1206. One example of a media reader 1260 is an optical drive such as a CD/DVD drive, which may be used to store data to and read data from a computer readable medium or storage product such as computer readable storage media 1262. Examples of suitable computer readable storage media include optical storage media such as a CD or DVD, magnetic media, or any other suitable data storage device. Media reader 1260 is alternatively able to be connected to the wearable device through the data port 1228 or computer readable program code is alternatively able to be provided to the wearable device 1200 through the wireless network 1250.

Figure 13:
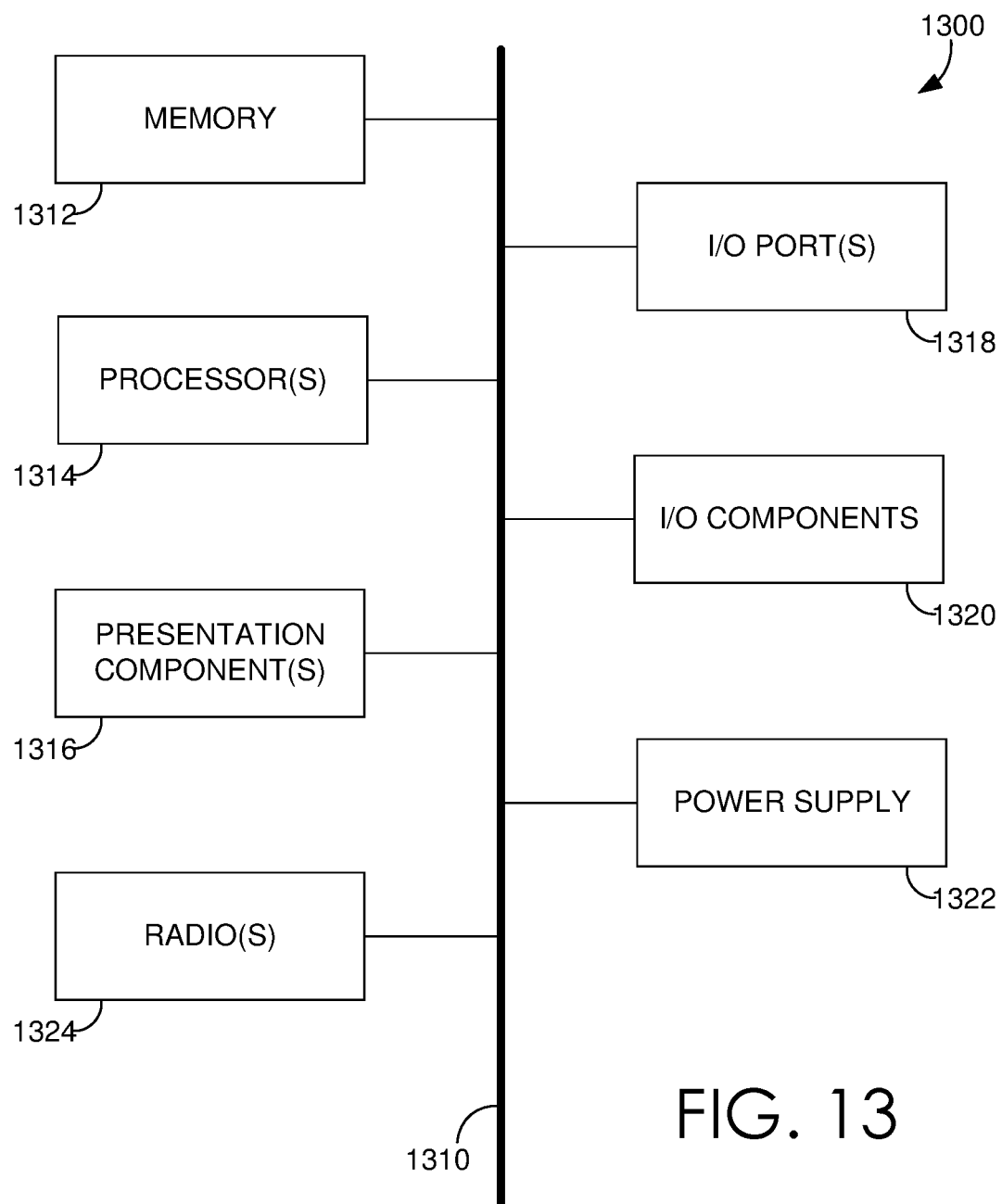
FIG. 13 provides a block diagram of an exemplary computing device in which some implementations of the present disclosure may be employed.

FIG. 13 provides a block diagram of an exemplary computing device 1300 in which some implementations of the present disclosure may be employed. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated. Any computing device discussed herein, such as but not limited to user computing devices 102-108 of FIG. 1, or any of the wearable devices discussed herein, may include similar operations, features, components, modules, and the like, as included in computing device 1300.

The invention may be described in the general context of computer code or machine-useable instructions, including computer-executable instructions such as program modules, being executed by a computer or other machine, such as a personal data assistant or another handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and another wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or another device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Accordingly, in one embodiment described herein, includes a method for operating a wearable device. The wearable device includes a photon-detector (e.g. a camera) and a photon-emitter (e.g. a photon source, a photon transmitter, a photon projector, or the like). The method includes receiving an instruction (e.g. a request) to provide a visual element at a first location within a field-of-view (FOV) of the photon-detector. In response to receiving the instructions, the photon-emitter may be employed to transmit photon beams. The photon beams are transmitted such that visual element is projected onto a surface of (or located at) the first location within the first FOV of the photon-detector. The visual element may be a telestration element. In at least some embodiments, the wearable device is a head-mounted display (HMD) device. The photon-emitter may include a coherent photon-source, such as but not limited to a laser. In another embodiment, the photon-emitter may include a light emitting diode (LED). The photon-emitter may include a collimated photon source.

The method may further include employing the photon-detector to generate image data of the first FOV of the photon-detector and providing the image data to a remote computing device. The image data may encode the surface located at the first location within the first FOV of the photon-detector. A user of the remote computing device may employ the remote computing device to view the image data and generate the instruction to provide the visual element at the first location within the first FOV of the photon-detector. The instruction may be received from the remote computing device.

In some embodiments, the instruction includes an indication of an object within the first FOV of the photon-detector. The photon-emitter may be employed to transmit the photon beams such that the projected visual element visually indicates the object within the first FOV of the photon-detector. The photon-detector may be employed to generate image data of a second FOV of the photon-detector, where the object is within the second FOV of the photon-detector. There may have been relative movement between the object and the user wearing the wearable device between the temporal displacement of the first and second FOVs of the photon-detector. For example, either the user or the object may have moved during the transition from the first FOV to the second FOV.

The method may employ a computer-vision engine, to select a portion of the image data that encodes the object. That is computer- and/or machine vision is employed to select the portion of the image data of the second FOV that encodes the object. A second location within the second FOV of the photon-detector is determined based on the selected portion of the image data. The photon-emitter is employed to transmit additional photon beams such that an updated visual element is projected onto the surface (or another surface). The surface (or the other surface) is located at the second location within the second FOV of the photon-detector. The updated visual element visually indicates the object within the second FOV of the photon-detector. Thus computer- and/or machine-vision may be employed to track the object.

In at least one embodiment, the photon-emitter is employed to transmit another photon beam. The other photon beam may be transmitted such that another visual element is projected onto another surface that is located at a boundary of the first FOV of the photon-detector. For instance, the other visual element may be a bounding box that marks the boundary of the first FOV of the photon-detector. In at least one embodiment, the other photon beam may be transmitted such that another visual element is projected onto another surface that is located at a center of the first FOV of the photon-detector. For example, the other visual element may be a solid circular (or oval), a "bulls-eye", a "cursor", "center-of-a-target", or the like, that marks the center of the first FOV of the photon-detector.

In at least one embodiment, the wearable device includes a display (e.g. a display device). The photon-detector is employed to generate image data of the first FOV of the photon-detector. A location of the display, relative to a line-of-sight (LOS) of the user wearing the wearable device, may be automatically determined. When the location of the display is located within the LOS of the user, the wearable device may be operated in a first operational mode (e.g. a display mode). When the location of the display is outside of (or excluded from) the LOS the of the user, the wearable device may be operated in a second operational mode (e.g. a projection mode). In at least one embodiment, when operating in the first operational mode, the display may be employed to display a combination, blend, composite, or a layering of the image data and the visual element. The visual element is located at a location on the display that corresponds to the first location within the first FOV of the photon-detector. The location of the display, relative to the LOS of the user, may be automatically determined based on a signal generated by one or more position-detecting sensors and/or switched included the wearable device. For instance, at least one Hall Effect switch (or a sensor) may be included in the wearable device.

Another embodiment includes a non-transitory computer storage media that store instructions. When the instructions are executed by a processor, the processor performs actions that enable one or more methods for operating a wearable device, such as but not limited to a head-mounted display (HMD) device. The wearable device includes a camera, a display, and a photon-emitter. The camera is employed to generate image data of a first field-of-view (FOV) of the camera. A location of the display, relative to a line-of-sight (LOS) of a user wearing the wearable device, is determined. When the location of the display is within the LOS of the user, the wearable device may be operated in a first operational mode (e.g. a display mode). When the location of the display is outside of and/or excluded from the LOS of the user, the wearable device is operated in a second operational mode (e.g. an projection mode).

More particularly, when the location of the display is within the LOS of the user, the display is employed to display a combination, a composite, a blend, or a layering of the image data and a visual element. The visual element is located at a location on the display that corresponds to a first location within the first FOV of the camera. When the location of the display is outside the LOS of the user, the photon-emitter is employed to transmit photon beams. Photon-beams are transmitted such that visual element is projected onto a surface located at the first location within the first FOV of the camera.

In at least one embodiment, the actions further comprising providing the image data to a remote device. A request to provide the visual element at the first location within the first FOV of the camera may be received from the remote computing device. That is, the remote computing device may be employed to provide the request to the wearable device (or another computing device). The request may be in the form of an instruction.

In some embodiments, the wearable device additionally includes a first member and a second member. In such embodiments, the location of the display relative to the LOS of the user may be determined by determining a relative rotational orientation between a first member and the second member. A variance of the rotational orientation between the first member and the second member generates a variance in a location of the first member relative to the display.

Another embodiment is directed towards a wearable device. The wearable device includes a photon-detector, a photon-emitter, a data transceiver, a processor, and a non-transitory computer storage media. The storage media stores instructions, that when executed by the process, cause the processor to perform actions. The actions may enable a method for operating the wearable device.

The actions may include generating image data of a first field-of-view (FOV) of the photon-detector. The data transceiver is employed to provide the image data to a remote computing device. The data transceiver may be employed to receive a request from the remote computing device. The request may be a request to provide a visual element at a first location within the first FOV of the photon-detector. The request may be in the form of an instruction. The photon-emitter is employed to transmit (or project) one or more photon beams on a surface that is located at the first location within the first FOV of the photon-detector. The photon beams may be transmitted such that the visual element is project onto the surface.

In at least one embodiment, the wearable device further includes a display, a rotating member, and a frame member that is configured and arranged for wearing the user. The rotating member is coupled to the display and rotatable coupled to the frame member and is this configured and arrange of rotating relative to the frame member. The actions further include determining a current angle between the frame member and the rotating member. When the current angle is less than a predetermined threshold angle, the actions further include operating the wearable device in a first operation mode (e.g. a display mode). When the current angle is greater than the predetermined threshold angle, the actions further include operating the wearable device in a second operational mode (e.g. an projection mode). In other embodiments, the first operational mode is a projection mode and the second operational mode is a display mode.

When operating in the display mode, the actions further include employing the display to display a combination, composite, blend, or layering of the image data and the visual element. The visual element is located at a location on the display that corresponds to the first location within the first FOV of the photon-detector.

In some embodiments, the wearable device further includes a position-detecting sensor, such as but not limited to a Hall Effect sensor (e.g. a Hall Effect switch). In response to a rotation of the rotating member relative to the frame member, the position-detecting sensor may generate a signal. An updated angle between the frame member and the rotating member may be determined based on the signal generated by the position-detecting sensor. When the updated angle is less than the predetermined threshold angle (and the wearable device is currently operated in the second operational mode), the operation of the wearable device may be transitioned to the first operational mode. Similarly, when the updated angle is greater than the predetermined threshold angle (and the wearable device is currently operated in the first operational mode), the operation of the wearable device may be transitioned to the second operational mode. In at least one embodiment, when the operational mode is transitioned from the projection mode to the display mode, the transmitting of the photon beams may be terminated.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A method for operating a wearable computing device that includes a frame member, a display, a photon-detector and photon-emitter, comprising:
   receiving an instruction to provide a visual element at a first location within a first field-of-view (FOV) of the photon-detector;
   in response to receiving the instruction and a determination that the display is currently located at a first position relative to the frame member, employing the display to display a composite image that includes a combination of the first FOV of the photon detector and the visual element located at the first location within the first FOV of the photon-detector; and
   in response to a determination that the display has been transitioned from the first position relative to the frame member to a second position relative to the frame member, transmitting, by the photon-emitter, one or more photon beams such that the visual element is projected onto a surface of the first location within the first FOV of the photon-detector.

2. The method of claim 1, wherein the wearable computing device is a head-mounted display (HMD) device, the photon-emitter includes a coherent photon source, and the photon-detector includes a camera.

3. The method of claim 1, further comprising:
   generating, by the photon-detector, image data of the first FOV of the photon-detector, wherein the image data encodes the surface located at the first location within the first FOV of the photon-detector;
   providing the image data to a remote computing device; and
   receiving, from the remote computing device, the instruction to provide the visual element at the first location within the first FOV of the photon-detector, wherein the remote computing device is configured to enable a remote user to view the image data and generate the instruction.

4. The method of claim 1, wherein the instruction includes an indication of an object within the first FOV of the photon-detector, the method further comprising:
   transmitting the one or more photon beams from the photon-emitter such that the projected visual element visually indicates the object within the first FOV of the photon-detector;
   generating, via the photon-detector, image data of a second FOV of the photon-detector, wherein the object is within the second FOV of the photon-detector;
   selecting, via a computer-vision engine, a portion of the image data that encodes the object;
   determining a second location within the second FOV of the photon-detector based on the selected portion of the image data; and
   transmitting, by the photon-emitter, one or more additional photon beams such that an updated visual element is projected onto at least one of the surface or another surface, wherein the at least one of the surface or another surface is located at the determined second location within the second FOV of the photon-detector and the updated visual element visually indicates the object within the second FOV of the photon-detector.

5. The method of claim 1, further comprising:
   transmitting at least one additional photon beam from the photon-emitter such that another visual element is projected onto another surface that is located at a boundary of the first FOV of the photon-detector.

6. The method of claim 1, wherein the photon-detector includes a depth-sensing camera and the method further comprises:
   generating, by the photon-detector, image data of the first FOV of the photon-detector;
   generating a three-dimensional (3D) map of the first FOV based on the image data; and
   maintaining a position of the visual element that is projected onto the surface of the first location based on the 3D map.

7. The method of claim 1, wherein the wearable computing device further includes a position-detecting sensor and the method further comprises:
   automatically determining that the display is currently located at the first position relative to the frame member based on a signal generated by the position-detecting sensor.

8. At least one computer storage media, having instructions that, when executed by at least one processor cause the at least one processor to perform actions comprising:
   generating, by a camera included in a wearable device, image data encoding a first image of a first field-of-view (FOV) of the camera;
   based on a determination that a location of a display included in the wearable device is currently located at a first position relative to a frame member, determining the display is within a line-of-sight (LOS) of a user that is wearing the wearable device;
   in response to the determination that the display is currently located at a first position relative to the frame member, displaying, by the display, a composite image that includes a combination of the first image encoded by the image data and a visual element located at a location on the display that corresponds to a first location within the first FOV of the camera; and
   in response to a determination that a location of the display has been transitioned from the first position relative to the frame member to a second position relative to the frame member transmitting one or more photon beams from a photon-emitter included in the wearable device, such that the visual element is projected onto a surface located at the first location within the first FOV of the camera.

9. The computer storage medium claim 8, the actions further comprising:

providing the image data to a remote computing device; and receiving, from the remote computing device, a request to provide the visual element at the first location within the first FOV of the camera.

10. The computer storage medium of claim 8, the actions further comprising:
receiving a request to provide the visual element such that the visual element visually indicates an object within the first FOV of the camera;
transmitting the one or more photon beams from the photon-emitter such that the projected visual element visually indicates the object within the first FOV of the camera;
generating, via the camera, additional image data of a second FOV of the camera, wherein the object is within the second FOV of the camera;
selecting, via a computer-vision engine, a portion of the additional image data that encodes the object;
determining a second location within the second FOV of the camera based on the selected portion of the additional image data; and
transmitting one or more additional photon beams from the photon-emitter such that an updated visual element is projected onto at least one of the surface or another surface, wherein the at least one of the surface or another surface is located at the second location within the second FOV of the camera and the projected updated visual element visually indicates the object within the second FOV of the camera.

11. The computer storage media of claim 8, the actions further comprising:
transmitting at least one additional photon beam from the photon-emitter such that another visual element is projected onto another surface that is located at one of a boundary or a center of the first FOV of the camera.

12. The computer storage media of claim 8, wherein determining whether the location of the display is within the LOS of the user includes determining a relative rotational orientation between a first member of the wearable device and a second member of the wearable device, and a variance of the rotational orientation between the first member and the second member generates a variance in a location of the first member relative to the display.

13. A wearable device, comprising:
a photon-detector;
a photon-emitter;
a data transceiver;
a display;
a position-detecting sensor;
a frame member;
at least one processor; and
at least one computer storage media storing computer-useable instructions that, when executed by the at least one processor, causes the at least one processor to perform actions including:
generating image data encoding a first image of a first field-of-view (FOV) of the photon-detector;
providing, by the data transceiver, the image data to a remote computing device;
receiving, by the data transceiver and from the remote computing device, an instruction to provide a visual element at a first location within the first FOV of the photon-detector;
determining, based on a signal generated the position-detecting sensor, that the display is currently located at a first position relative to the frame member; and in response to the determining that the display is located at a first position relative to the frame member, employing the display to display a composite image that includes a combination of the first FOV of the photon detector and the visual element located at the first location within the first FOV of the photon-detector; and in response to a determination that the display has been transitioned from the first position relative to the frame member to a second position relative to the frame member, transmitting, by the photon-emitter, one or more photon beams such that the visual element is projected onto a surface of the first location within the first FOV of the photon-detector.

14. The wearable device of claim 13, wherein the instruction includes an indication of an object within the first FOV of the photon-detector and the actions further include:
transmitting the one or more photon beams from the photon-emitter such that the projected visual element visually to indicates the object within the first FOV of the photon-detector;
generating additional image data of a second FOV of the photon-detector, wherein the object is within the second FOV of the photon-detector;
selecting, by a computer-vision engine, a portion of the additional image data that encodes the object;
determining a second location within the second FOV of the photon-detector based on the selected portion of the additional image data; and
transmitting one or more additional photon beams from the photon-emitter such that an updated visual element is projected onto at least one of the surface or another surface, wherein the at least one of the surface or another surface is located at the determined second location within the second FOV of the photon-detector and the updated visual element visually indicates the object within the second FOV of the photon-detector.

15. The wearable device of claim 13, the actions further comprising:
transmitting, by the photon-emitter, at least one additional photon beam from the photon-emitter such that another visual element is projected onto another surface that is located at one of a boundary or a center of the first FOV of the photon-detector.

16. The wearable device of claim 13, further comprising:
a rotating member that is coupled to the display, rotatabley coupled to the frame member, and configured and arranged for rotating relative to the frame member, and wherein the actions further include:
determining a current angle between the frame member and the rotating member based on the signal generated by the position-detecting sensor; and
determining that the display is located at the first position relative to the frame member based on determining the current angle between the frame member and the rotating member.

17. The wearable device of claim 16, wherein the actions further include:
in response to a rotation of the rotating member relative to the frame member, generating, by the position-detecting sensor, another signal;
determining an updated angle between the frame member and the rotating member based on the other signal generated by the position-detecting sensor;
determining, based on determining the updated angle between the frame member and the rotating member, that the display now located at a second position relative to the frame member; and in response to determining that the display is now located at the second position relative to the frame member, terminating displaying, by the display, the composite image.

18. The method of claim 1, wherein the first position relative to the frame member is within a line-of-sight (LOS) of a user of the wearable computing device and the second position relative to the frame member is outside of the LOS of the user.

* * * * *